(12) United States Patent
Touma

(10) Patent No.: US 12,005,587 B2
(45) Date of Patent: Jun. 11, 2024

(54) ROBOT SYSTEM AND OPERATION AUTHORITY SETTING PROGRAM

(71) Applicant: DENSO WAVE INCORPORATED, Chita-gun (JP)

(72) Inventor: Hirota Touma, Chita-gun (JP)

(73) Assignee: DENSO WAVE INCORPORATED, Aichi (JP)

( * ) Notice: Subject to any disclaimer, the term of this patent is extended or adjusted under 35 U.S.C. 154(b) by 408 days.

(21) Appl. No.: 17/606,333

(22) PCT Filed: Apr. 23, 2020

(86) PCT No.: PCT/JP2020/017518
§ 371 (c)(1),
(2) Date: Oct. 25, 2021

(87) PCT Pub. No.: WO2020/218429
PCT Pub. Date: Oct. 29, 2020

(65) Prior Publication Data
US 2022/0203539 A1    Jun. 30, 2022

(30) Foreign Application Priority Data
Apr. 25, 2019    (JP) .................................. 2019-084120

(51) Int. Cl.
*G06F 17/00*    (2019.01)
*B25J 9/16*    (2006.01)
(Continued)

(52) U.S. Cl.
CPC ............. *B25J 9/1676* (2013.01); *B25J 13/06* (2013.01); *G05B 19/409* (2013.01); *G06F 21/44* (2013.01); *G05B 2219/34456* (2013.01)

(58) Field of Classification Search
CPC ........ B25J 9/1676; B25J 13/06; B25J 9/1656; B25J 13/006; B25J 19/06; G05B 19/409;
(Continued)

(56) References Cited

U.S. PATENT DOCUMENTS

| | | | |
|---|---|---|---|
| 7,720,572 B2 * | 5/2010 | Ziegler | G05D 1/0274 713/153 |
| 8,195,333 B2 * | 6/2012 | Ziegler | B25J 9/1697 318/568.25 |

(Continued)

FOREIGN PATENT DOCUMENTS

| | | | | |
|---|---|---|---|---|
| DE | 102018001241 A1 * | 8/2018 | | B25J 9/16 |
| EP | 1 782 928 B1 | 5/2008 | | |

(Continued)

OTHER PUBLICATIONS

Guard Against Robot Downtime with Password Protection (Year: 2024).*

(Continued)

*Primary Examiner* — Ronnie M Mancho
(74) *Attorney, Agent, or Firm* — Oliff PLC

(57) ABSTRACT

A robot system includes: a robot; a plurality of operation terminals that receive an input of a password for acquiring operation authority of the robot and an operation input for operating the robot from a user; and a robot controller communicable with the operation terminals. The robot controller drives, in a controlled manner, the robot according to operation from a single operation terminal among the operation terminals. The robot controller includes a password storage unit that stores a password for granting operation authority of the robot to the operation terminal. The robot controller further includes an operation authority grant processing unit that grants operation authority of the robot to a single operation terminal to which a proper predetermined password stored in the password storage unit is first input in (Continued)

a state in which operation authority of the robot is not granted to any operation terminal.

17 Claims, 12 Drawing Sheets

(51) Int. Cl.
  *B25J 13/06* (2006.01)
  *G05B 19/409* (2006.01)
  *G06F 21/44* (2013.01)
(58) Field of Classification Search
  CPC ........... G05B 2219/34456; G05B 2219/33192; G05B 2219/36542; G05B 2219/39438; G05B 2219/40099; G06F 21/44; G06F 21/31
  USPC ........................................................ 700/255
  See application file for complete search history.

(56) References Cited

U.S. PATENT DOCUMENTS

| | | | |
|---|---|---|---|
| 9,919,420 B1* | 3/2018 | Theobald | B25J 13/003 |
| 10,349,245 B2* | 7/2019 | Tokuchi | H04W 12/08 |
| 11,093,590 B2* | 8/2021 | Erhart | B25J 19/023 |
| 2017/0057083 A1 | 3/2017 | Maeda | |
| 2017/0113343 A1 | 4/2017 | Inaba | |
| 2017/0286651 A1* | 10/2017 | Erhart | B25J 19/023 |
| 2018/0071913 A1 | 3/2018 | Matsudaira et al. | |
| 2018/0229363 A1* | 8/2018 | Kurihara | B25J 9/1674 |
| 2018/0310118 A1* | 10/2018 | Tokuchi | H04W 4/38 |

FOREIGN PATENT DOCUMENTS

| | | |
|---|---|---|
| JP | 2004-243472 A | 9/2004 |
| JP | 2010-20521 A | 1/2010 |
| JP | 2011-224776 A | 11/2011 |
| JP | 5474765 B2 | 4/2014 |
| JP | 2015-044280 A | 3/2015 |
| JP | 2016-000436 A | 1/2016 |
| WO | WO-2020218429 A1 * | 10/2020 ............ B25J 13/006 |

OTHER PUBLICATIONS

Jul. 14, 2020 Search Report issued in International Patent Application No. PCT/JP2020/017518.

* cited by examiner

ROBOT SYSTEM AND OPERATION AUTHORITY SETTING PROGRAM

CROSS-REFERENCE TO RELATED APPLICATION

This application is based on and claims the benefit of priority from earlier Japanese Patent Application No. 2019-084120 filed on Apr. 25, 2019 the description of which is incorporated herein by reference.

BACKGROUND

Technical Field

The present disclosure relates to a robot system that performs communication control between a robot and an operation terminal that operates the robot, in particular, communication control related to operation authority, a robot controller of the robot system, the operation terminal, an operation authority setting program, and a method of controlling the robot.

Related Art

When a robot is operated by a user using an operation terminal, it is typical that operation of a single robot to be operated is controlled by a single operation terminal that receives operation from the user, and the other operation terminals cannot control the robot while the robot is controlled by a single operation terminal. The reason for this is that, if a single robot is controlled by operation instructions simultaneously given from a plurality of operation terminals, the operation instructions from the plurality of operation terminals may interfere with each other and cause the robot to perform an operation different from the intention of the user. Such a problem may occur not only in the cases where a teaching pendant exclusively designed for the operation of the robot is used, but also in the cases where a general-purpose product which is commercially available, such as a tablet terminal or a smartphone, is used as the operation terminal.

There has been a conventional technique in which an operation terminal used for operation is registered to the robot controller in advance to thereby exclude communication connection between an unregistered operation terminal and the robot controller. This technique aims to solve the above problem by limiting the operation terminal that can be communicably connected to the robot controller. Further, in this technique, the user registers ID information unique to the target operation terminal, such as an IP address or a MAC address, to the robot controller in advance. Upon receiving a request for communication connection from the operation terminal, the robot controller permits communication connection to the operation terminal registered in advance, and rejects communication connection to an unregistered operation terminal. Thus, only a single operation terminal can be communicably connected to a single robot controller.

However, according to the above configuration, when the operation terminal whose ID information is registered cannot be continuously used due to, for example, failure, loss, or battery exhaustion, and the user is to use an alternative operation terminal to operate the robot, the user is required to re-register the ID information of the alternative operation terminal to the robot controller.

When the robot is used at a manufacturing site, for example, such re-registration may be difficult for workers at the site. In this case, it is necessary to call a person who can perform the re-registration, such as a manager of the robot, when re-registration is performed. Accordingly, it takes time and effort to complete the re-registration. However, at a site such as a manufacturing site, where the control of the robot operation needs to be resumed as soon as possible, it is required to quickly complete re-registration so that an alternative operation terminal can be used as soon as possible. In addition, when a robot is used in a household or the like by a general user who is unfamiliar with the use of robot, the re-registration described above may be difficult for a general user who is unfamiliar with the use of the robot.

CITATION LIST

Patent Literature

[PTL 1] JP 2016-436 A

SUMMARY

The present disclosure has been made in view of the above circumstances, and is directed to provide a robot system in which operation of a single robot is controlled by a single operation terminal to which operation authority is granted among a plurality of operation terminals communicable with the single robot, the robot system being configured to cancel the granted operation authority while maintaining control of the operation of the single robot, and easily set granting of operation authority to any one of the plurality of operation terminals communicable with the single robot, and to provide an operation authority setting program.

In order to achieve the above object, according to a first example, a robot system includes: a robot; an operation terminal that receives an input of an authority code (for example, password) for acquiring operation authority of the robot and an operation input for operating the robot from a user of the robot; and a robot controller configured to be communicable with a plurality of the operation terminals and grant operation authority of the robot to the operation terminal, the robot controller being configured to drive and control the robot according to the operation input from a single operation terminal to which the operation authority has been granted among the plurality of the operation terminals, cancel the operation authority that has been granted to the operation terminal, and be capable of granting the operation authority to a single operation terminal to which the operation authority has not been granted. The robot controller includes: an authority code storage unit that stores a proper predetermined authority code for granting operation authority of the robot to the operation terminal; and an operation authority grant processing unit that determines whether the operation authority of the robot has not been granted to any operation terminal, and, when it is determined that the operation authority of the robot has not been granted to any operation terminal, grants the operation authority of the robot to a single operation terminal to which the predetermined authority code stored in the authority code storage unit is first input.

With this configuration, in a state in which the operation authority of the robot is not granted to any operation terminal, the robot controller grants the operation authority of the robot to the operation terminal to which a proper predetermined authority code is first input. That is, since the robot controller grants operation authority to only a single operation terminal to which a proper predetermined authority code is first input, the robot controller does not simultaneously grant operation authority in a duplicate manner to a plurality of operation terminals. Accordingly, since one-to-one relationship can be established between the operation terminal that receives operation from the user and the robot to be operated, it is possible to prevent operation instructions from the plurality of operation terminals from interfering with each other, and thus prevent an operation different from the intention of the user and ensure safety.

Further, according to this configuration, the robot controller grants operation authority of the robot to a single operation terminal to which a proper predetermined authority code is input. That is, when the user inputs an authority code to the operation terminal, the operation terminal to which the authority code is input can acquire the operation authority of the robot. With this configuration, the user can switch the operation terminal that acquires operation authority by taking over the authority code without registering the ID information or the like of the operation terminal to the robot controller.

As described above, according to this configuration, when the operation terminal currently having the operation authority cannot be continuously used due to, for example, failure, loss, or battery exhaustion and needs to be switched to an alternative operation terminal to operate the robot, the operation terminal having the operation authority can be quickly and easily switched only by an operation to the operation terminal, that is, only by a worker at the site without calling a manager of the robot, and without requiring operation such as re-registration of the ID information of the alternative operation terminal to the robot controller.

According to a second example, in the robot system, the operation terminal includes: an input unit that receives the operation input from a user of the robot and detects the operation input; an authority code request processing unit that requests the robot controller with which communication connection is established, when the communication connection with the robot controller is established, to transmit the predetermined authority code stored in the authority code storage unit; an authority code verification processing unit that verifies and determines whether the predetermined authority code received from the robot controller matches the authority code input to the input unit when the authority code is input to the input unit by a user; and an operation authority request processing unit that requests the robot controller to grant the operation authority of the robot when the authority code verification processing unit determines that the authority codes match.

The robot controller further includes an authority code transmission processing unit that transmits the authority code recorded in the authority code storage unit to the operation terminal with which communication connection is established. When a request for granting the operation authority is made by the operation authority request processing unit, the operation authority grant processing unit grants the operation authority to the operation terminal that has made the request for granting the operation authority.

With this configuration, verification of the authority code input to the operation terminal to a proper predetermined authority code stored in the robot controller is performed by the operation terminal, not by the robot controller. Accordingly, even when the robot controller is simultaneously accessed from a plurality of operation terminals, the robot controller does not need to verify the authority code input to the respective operation terminals, which reduces the processing load of the robot controller.

According to a third example, in the robot system, the operation terminal includes: an input unit that receives the operation input from a user of the robot and detects the operation input; and an information transmission processing unit that transmits input information based on the operation input to the robot controller when the input unit detects the operation input from the user. The robot controller further includes an authority code verification processing unit that verifies and determines whether the input information received from the operation terminal matches the predetermined authority code stored in the authority code storage unit, and, when the authority code verification processing unit determines that the input information received from the operation terminal matches the predetermined authority code stored in the authority code storage unit, the operation authority grant processing unit grants the operation authority of the robot to the operation terminal that has transmitted the input information.

With this configuration, verification of the authority code input to the operation terminal to a proper predetermined authority code stored in the robot controller is performed by the robot controller, not by the operation terminal. Accordingly, the robot controller does not need to transmit an authority code used for granting robot operation authority to each operation terminal. Therefore, a risk that the authority code used for granting robot operation authority may leak from the robot controller can be minimized, and as a result, for example, high security can be ensured in granting of robot operation authority.

There may be a case, for example, where the communication between the operation terminal having the operation authority and the robot controller is disconnected due to failure, battery exhaustion, or the like. In this case, if the operation authority of the operation terminal remains uncancelled, operation authority cannot be granted to an alternative operation terminal, and thus the operation terminal cannot be switched to an alternative operation terminal. Further, when the user terminates the operation of the robot, the operation authority needs to be cancelled and quickly granted to another operation terminal to operate the robot.

According to a fourth example, in the robot system, the robot controller further includes an operation authority cancellation processing unit that determines whether connection with the operation terminal to which the operation authority has been granted is disconnected and communication with the robot controller is restored before a predetermined period of time elapses after the disconnection, and, when it is determined that connection with the operation terminal to which the operation authority has been granted is disconnected and communication with the robot controller is not restored before a predetermined period of time elapses after the disconnection, or when an operation for cancelling the operation authority is input from the operation terminal to which the operation authority has been granted, cancels the operation authority to the operation terminal.

With this configuration, the operation authority can be cancelled when the communication between the operation terminal having the operation authority and the robot controller is disconnected due to failure, battery exhaustion, or the like and is not restored before a predetermined period of time elapses, or at the user's discretion. Thus, the robot controller can quickly grant operation authority to another operation terminal.

According to a fifth example, in the robot system, the robot controller further includes an authority information transmission processing unit that transmits authority information indicating a current status of granting the operation authority to the operation terminal with which communication connection is established. The operation terminal further includes a display unit that displays information to a user; and a display processing unit that displays an input screen of the authority code on the display unit when a granting status of the operation authority based on the authority information indicates that the operation authority is not granted to any operation terminal, and displays a message on the display unit that the operation authority cannot be granted when the operation authority has already been granted to another operation terminal.

With this configuration, the robot controller prevents duplicate grant of operation authority to another operation terminal when the operation authority has already been granted to the operation terminal. The user can recognize the current status of the operation authority of the robot from the content displayed on the display unit. This results in the improvement in convenience of a user, for example, who checks a granting status of the operation authority of the robot.

According to a sixth example, in the robot system, the robot is assumed to collaborate with a human, and is designed to require no safety fence in an operation environment of the robot. Such a robot is assumed to be used not only at a conventional manufacturing site or the like, which is familiar with the use of robots, but also in a non-manufacturing company or a general household, which is unfamiliar with the use of robots. According to the robot system having this configuration, as described above, the operation terminal having the operation authority can be easily switched without registering the ID information or the like of the operation device to the robot controller. Therefore, the robot system according to the present disclosure can be easily used in a non-manufacturing company or a general household, which is unfamiliar with the use of robots.

A seventh example is an operation authority setting program that implements the robot system according to the above first example. That is, by installing and executing the operation authority setting program having this configuration in an existing robot controller and an existing operation terminal, the existing robot controller and the existing operation terminal can be configured as the robot system described in the above first example.

According to an eighth example, in the robot system, a display unit is provided in either the operation terminal or the robot controller, the display unit being configured to display a storage location of the operation terminal to a user of the robot, the operation authority cancellation processing unit, when cancelling the operation authority from the operation terminal, transmits a cancellation signal to the display unit, and the display unit, when receiving the cancellation signal from the operation authority cancellation processing unit, displays a storage location of the operation terminal.

Accordingly, even when it becomes necessary for a user of the robot who does not know the storage location of the spare operation terminal to grant the operation authority of the robot to the spare operation terminal, the spare operation terminal can be quickly prepared and the operation authority can be granted to the spare operation terminal by recognizing the storage location of the operation terminal displayed on the display unit.

A ninth example is a method of controlling a robot by which the functions of the robot system according to the above first example are executed. According to the ninth example, the same effects as those of the first example are achieved.

DESCRIPTION OF THE EMBODIMENTS

Figure 1:
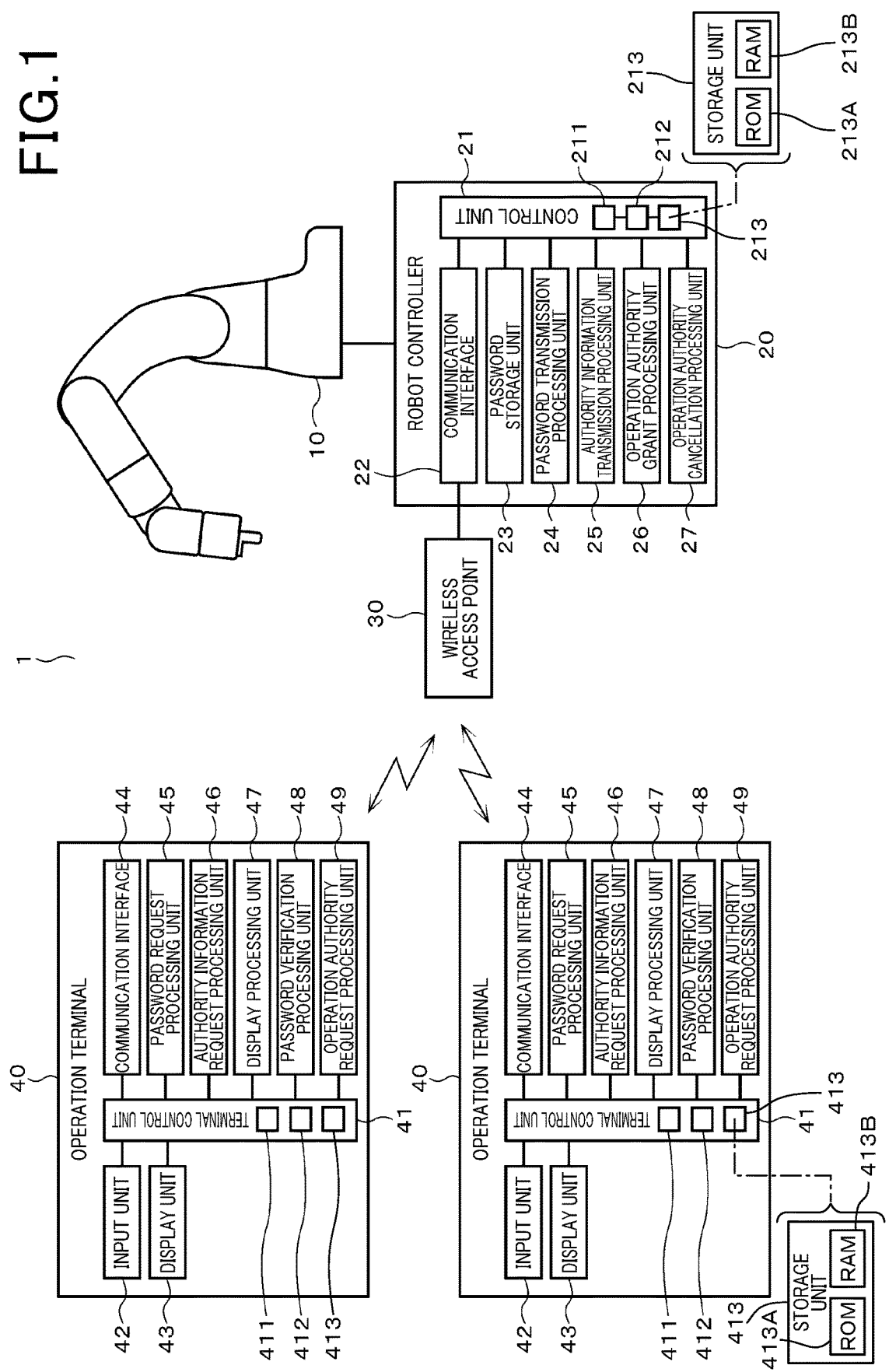
FIG. 1 is a block diagram schematically illustrating an example of a configuration of a robot system according to a first embodiment.

With reference to the drawings, a plurality of embodiments according to the present disclosure will be described. Throughout the embodiments, the same reference numerals are used to refer to substantially the same components.

First Embodiment

With reference to FIGS. 1 to 11, a first embodiment of the present disclosure will be described. As shown in FIG. 1, a robot system 1 of the first embodiment includes a robot 10, a robot controller 20, a wireless access point 30, and an operation terminal 40.

As the robot 10, for example, an articulated robot having a plurality of drive axes is used. In the present embodiment, the robot 10 is, for example, a device that is small and light enough to be carried by a person or an articulated robot having a plurality of movable axes. That is, the robot 10 of the present embodiment may be, for example, a small portable robot. Further, for example, the robot 10 of the present embodiment is assumed to collaborate with a human, and is designed to require no safety fence in the operation environment of the robot 10. The robot 10 incorporates the robot controller 20, for example, and has an overall weight of approximately 4 kilo-grams and a load capacity of approximately 500 grams.

The robot 10 is not limited to a small portable robot. For example, the robot 10 may be an installation-type robot that is not for portable use. Further, the robot 10 may be a robot that requires installation of a safety fence. Alternatively, the robot 10 may be a cleaning robot. Further, the robot 10 may be a humanoid robot. The robot 10 may not necessarily incorporate the robot controller 20.

The robot controller 20 includes a control circuit, a servo control unit, a power supply device, and the like (not shown). The robot controller 20 controls driving of the robot 10 by controlling a servo motor (not shown) for each axis according to pre-stored operation programs or teaching data set by the operation terminal 40.

The robot controller 20 is configured to be capable of simultaneously communicating with a plurality of operation terminals 40. The robot controller 20 grants operation authority of the robot 10 to a single operation terminal 40 which satisfies a predetermined condition, that is, the operation terminal 40 to which a proper (that is, correct or matching) password preset to the single operation terminal 40 is input among the plurality of operation terminals 40 connected to be communicable with the robot controller 20. In other words, in a state in which the operation authority of the robot 10 is not granted to any operation terminal 40, the robot controller 20 grants the operation authority of the robot 10 to the operation terminal 40 to which a proper predetermined password is first input in the earliest stage. Then, the robot controller 20 can drive and control the robot 10 according to operation from the single operation terminal 40 to which the operation authority is granted.

Specifically, the robot controller 20 includes a control unit 21, a communication interface 22, a password storage unit 23, a password transmission processing unit 24, an authority information transmission processing unit 25, an operation authority grant processing unit 26, and an operation authority cancellation processing unit 27. The control unit 21 performs control of the robot controller 20. The control unit 21 is mainly composed of a microcomputer including, for example, a CPU (central processing unit) 211 and a storage area 212 configured with a rewritable flash memory or the like as a work area. The CPU 211 controls the operation of the control unit 21. The controller 20 further includes a storage unit 213. The storage unit 213 includes a storage medium such as a ROM (read only memory (e.g., EEPROM)) 213A, a RAM (random access memory) 213B and a non-volatile memory (not shown) as appropriate, and stores a predetermined program executable by the CPU 211. That is, the storage unit 213 functions as a non-transitory computer-readable recording medium, and stores a source code of a predetermined program procedure. The program is read out into the storage area 212 and executed. The RAM 213B is configured to be capable of temporarily storing the data which are being processed by the CPU 211. The storage area 212 is configured to be readable by a memory element such as a RAM. The CPU 211 may be referred to as another name (e.g., processor or arithmetic unit) as long as it is an element mainly responsible for arithmetic operations and has a similar function. The processing executed by the control unit 21 (that is, CPU 211) will be described later. The communication interface 22 and the password storage unit 23 are communicably connected to the control unit 21.

The communication interface 22 directly or indirectly performs wired or wireless communication with a device outside the robot controller 20. In the present embodiment, the communication interface 22 is connected via a wire to the wireless access point 30 as an access point. The communication interface 22 is wirelessly communicably connected to the operation terminal 40, which is an external device, via the wireless access point 30. The communication interface 22 may also have a function as a communication establishment determination unit that determines whether wireless communication is established between the controller 20 and the operation terminal 40. For example, when it is determined that the wireless communication has been established, the communication interface 22 transmits the determination result to the control unit 21. The wireless access point 30 may be incorporated in the robot controller 20. The communication interface 22 may be connected to the operation terminal 40 via a wire. The wireless access point 30 may be communicably connected to the operation terminal 40 via a wireless or wired LAN. The wireless access point 30 may be communicably connected to the operation terminal 40 via the internet or a telephone line.

The password storage unit 23 stores a password used for granting operation authority of the robot 10 to a single operation terminal 40 among a plurality of operation terminals 40 communicably connected. The password storage unit 23 may use a part of the storage area 212. The password storage unit 23 may be configured by a storage area different from the storage area 212. In the present embodiment, a password is constituted by, for example, characters, numbers and/or symbols, and functions as an authority code used for granting operation authority of the robot 10 to a single operation terminal 40 among a plurality of operation terminals 40. The authority code is defined as information used for granting or obtaining operation authority.

The authority code (or authority information) may be various information codes such as a bar code and a QR code (registered trademark) in addition to the password, or may be an ID card given in advance to a user who is intended to use the robot 10. In this case, the operation terminal 40 can be easily switched while ensuring the security compared with a case where an identification code is input. In the present embodiment described below, it is assumed that the authority code is a password.

The password is preset at the factory of the robot 10, for example. The password may be unique for each robot 10. The password may be set to be non-rewritable at the factory of the robot 10. Further, the password may be configured to be arbitrarily set by the user, that is, rewritable. In this case, the password may not necessarily be unique to the robot 10, and it is not prevented that a plurality of robots 10 have the same password. In the present embodiment, the password may be a value different from the IP address or MAC address of the robot 10, and can be set to a value unique to the robot 10. Further, the password may not necessarily be managed in a secret state, and may be displayed on, for example, a surface of the housing of the robot 10 or the robot controller 20.

The storage area 212 of the control unit 21 stores an operation authority granting program for granting operation authority of the robot 10 to the operation terminal 40. Further, the operation authority granting program may be configured to be downloaded as an application from a server of a manufacturer via an electric communication line such as the internet, and added as necessary by installing the application into the robot controller 20.

The control unit 21 virtually implements the password transmission processing unit 24, the authority information transmission processing unit 25, the operation authority grant processing unit 26, and the operation authority cancellation processing unit 27 by software by executing the operation authority granting program in the CPU 211. Alternatively, the password transmission processing unit 24, the authority information transmission processing unit 25, the operation authority grant processing unit 26, and the operation authority cancellation processing unit 27 may also be implemented by hardware as an integrated circuit which is integrated with the control unit 21, for example.

The password transmission processing unit 24 executes password transmission processing. For example, the password transmission processing unit 24 executes processing, as the password transmission processing, in which a password recorded in the password storage unit 23 is transmitted to the operation terminal 40 with which communication connection has been established. In the present embodiment, when the robot controller 20 is connected to a plurality of operation terminals 40, the password transmission processing unit 24 transmits an encrypted password to all the connected operation terminals 40. In this case, the operation terminals 40 do not display or read the received password so that the user does not recognize the received password.

The authority information transmission processing unit 25 executes authority information transmission processing. For example, as the authority information transmission processing, the authority information transmission processing unit 25 executes processing in which, in response to a request from an operation terminal 40 for the current status of granting the operation authority of the robot 10, authority information indicating the current status of granting the operation authority of the robot 10 is transmitted to the operation terminal 40 that has made the request. According to the authority information indicating the current status of granting the operation authority transmitted in this processing, it is indicated, for example, whether the robot controller 20 has already granted the operation authority of the robot 10 to any operation terminal 40 other than the operation terminal 40 that has made the request for the status of granting the operation authority or whether the robot controller 20 has not yet granted the operation authority of the robot 10 to any operation terminal 40.

The operation authority grant processing unit 26 executes operation authority grant processing. For example, the operation authority grant processing unit 26 executes processing, as the operation authority grant processing, in which operation authority of the robot 10 is granted to a single operation terminal 40 to which a proper predetermined password stored in the password storage unit 23 is input among one or more operation terminals 40 that has established communication connection with the robot controller 20. The above function of the operation authority grant processing unit 26 is also executed by the robot controller 20 as an operation authority processing program.

When the robot controller 20 has not yet granted the operation authority to the other operation terminals 40 and the user inputs a proper predetermined password to the operation terminal 40, the operation terminal 40 requests the robot controller 20 to grant the operation authority. For example, the operation terminal 40 requests to grant operation authority by transmitting an authority granting request signal to the controller 20. The operation authority grant processing unit 26 determines whether a request for granting operation authority has been made by the operation terminal 40. When it is determined that a request for granting operation authority has been made by the operation terminal 40, the operation authority grant processing unit 26 executes processing for granting the operation authority of the robot 10 to the operation terminal 40 that has made the request for granting operation authority.

The operation authority cancellation processing unit 27 executes operation authority cancellation processing. For example, the operation authority cancellation processing unit 27 executes processing, as the operation authority cancellation processing, in which it is determined via the wireless access point 30 whether the connection with the operation terminal 40 to which the operation authority has been granted is disconnected and restored before a predetermined period of time elapses after the disconnection. Further, the operation authority cancellation processing unit 27 determines via the wireless access point 30 whether an operation for cancelling the operation authority is input from the operation terminal 40 to which the operation authority has been granted. When it is determined that the connection with the operation terminal 40 to which the operation authority has been granted is disconnected and is not restored before a predetermined period of time elapses after the disconnection, or when it is determined that an operation for cancelling the operation authority is input from the operation terminal 40 to which the operation authority has been granted, the operation authority cancellation processing unit 27 executes processing for cancelling the operation authority from the operation terminal 40.

The operation terminal 40 operates the robot 10 via the robot controller 20. The operation terminal 40 may not limited to a teaching pendant exclusively designed for the operation of the robot, and may also be a general-purpose product which is commercially available, such as a tablet terminal or a smartphone. The operation terminal 40 includes a terminal control unit 41, an input unit 42, a display unit 43, a communication interface 44, a password request processing unit 45, an authority information request processing unit 46, a display processing unit 47, a password verification processing unit 48, and an operation authority request processing unit 49.

The terminal control unit 41 performs control of the operation terminal 40. The terminal control unit 41 is mainly composed of a microcomputer including, for example, a CPU (central processing unit) 411 and a storage area 412 configured with a rewritable flash memory or the like as a work area. The CPU 411 controls the operation of the control unit 41. The operation terminal 40 further includes a storage unit 413. The storage unit 413 includes a storage medium such as a ROM (read only memory (e.g., EEPROM)) 413A, a RAM (random access memory) 4138 and a non-volatile memory (not shown) as appropriate, and stores a predetermined program executable by the CPU 411. That is, the storage unit 413 functions as a non-transitory computer-readable recording medium, and stores a source code of a predetermined program procedure. The program is read out into the storage area 412 for execution. The RAM 4138 is configured to be capable of temporarily storing the data which are being processed by the CPU 411. The storage area 412 is configured to be readable by a memory element such as a RAM. The CPU 411 may be referred to as another name (e.g., processor or arithmetic unit) as long as it is an element mainly responsible for arithmetic operations and has a similar function. The processing executed by the control unit 41 (that is, CPU 411) will be described later. The input unit 42, the display unit 43, and the communication interface 44 electrically connected to the terminal control unit 41.

The input unit 42 receives an input operation by a user. That is, the input unit 42 is configured so that the user performs an input operation via the input unit 42, and detect the input operation input by the user. The input unit 42 may be, for example, a touch panel that receives a touch operation input by the user. The display unit 43 may be, for example, a liquid crystal panel or an organic EL panel, and displays various information. In this case, the input unit 42 and the display unit 43 are disposed overlapping each other to constitute a touch panel display. Further, the input unit 42 may also be a button as a physical entity. The display unit 43 displays, for example, an icon of an application that executes an operation authority acquisition granting program, which is described later. With this application, the operation terminal 40 can acquire operation authority of the robot 10. The input unit 42 detects, for example, an operation that the user touches the icon of the application as an operation to activate the application. When the input unit 42 determines that the operation to activate the application has been detected, the application that executes the operation authority acquisition granting program stored in the operation terminal 40 is activated. Further, the input unit 42 detects a password input operation. Upon detecting the password, the input unit 42 transmits a signal indicating that the password has been detected to the control unit 41. The control unit 41, when receiving a signal indicating that the password has been detected from the input unit 42, causes the password verification processing unit 48 to execute password verification processing, which is described later. The display unit 43 displays a screen through which the user inputs information on the robot 10 on the connection destination (hereinafter, referred to as a connection destination input screen 51), and a message that the operation authority cannot be granted (hereinafter, referred to as an operation authority unavailable message 52) The display unit 43 displays a screen for receiving a password input (hereinafter, referred to as a password input screen 53), and a message that the passwords do not match (hereinafter, referred to as a password mismatch message 54). The display unit 43 displays a message that the operation authority has been granted (hereinafter, referred to as an operation authority available message 55). The various information may be, for example, information on the robot 10 connected to the operation terminal 40, specifically, the name and IP address of the robot 10 connected to the operation terminal 40.

The communication interface 44 directly or indirectly performs wired or wireless communication with a device outside the operation terminal 40. In the present embodiment, the communication interface 44 of the operation terminal 40 is wirelessly connected to the wireless access point 30, and thus communicably connected to the communication interface 22 of the robot controller 20 via the wireless access point 30. The communication interface 44 may also have a function as a communication establishment determination unit that determines whether wireless communication is established between the controller 20 and the operation terminal 40. For example, when it is determined that the wireless communication has been established, the communication interface 44 transmits the determination result to the control unit 41.

Further, the storage area 412 of the terminal control unit 41 stores an operation authority acquisition program for acquiring operation authority of the robot 10 from the robot controller 20. The operation authority acquisition program corresponds to the operation authority granting program stored in the storage area 212 of the robot controller 20, and constitutes an operation authority setting program together with the operation authority granting program. When the operation authority granting program is executed by the control unit 21 of the robot controller 20 while the operation authority granting program is executed by the terminal control unit 41 of the operation terminal 40, the robot controller 20 and the operation terminal 40 cooperate with each other to execute processing for granting the operation authority of the robot 10 to the operation terminal 40.

The operation authority acquisition program may be pre-stored in, for example, the storage area 412 of the terminal control unit 41. Further, the operation authority acquisition program may be configured to be downloaded as an application from a server of a manufacturer via an electric communication line such as the internet, and added as necessary by installing the application into the terminal control unit 41.

The terminal control unit 41 virtually implements the password request processing unit 45, the authority information request processing unit 46, the display processing unit 47, the password verification processing unit 48, and the operation authority request processing unit 49 by software by executing the operation authority acquisition program in the CPU 411. When the operation terminal 40 is a teaching pendant or the like exclusively designed for the operation of the robot, the password request processing unit 45, the authority information request processing unit 46, the display processing unit 47, the password verification processing unit 48, and the operation authority request processing unit 49 may also be implemented by hardware as an integrated circuit which is integrated with the terminal control unit 41, for example.

The password request processing unit 45 executes password request processing. For example, the password request processing unit 45 executes processing, as the password request processing, in which, when communication connection between the operation terminal 40 and the robot controller 20 is established, the password request processing unit 45 requests the robot controller 20 with which the communication connection has been established to transmit a password stored in the password storage unit 23. For example, the password request processing unit 45 requests the robot controller 20 to transmit the password by transmitting a password request signal to the robot controller 20. Upon receiving the request from the password request processing unit 45 of the operation terminal 40, the password transmission processing unit 24 of the robot controller 20 executes the above password transmission processing. Thus, the password stored in the password storage unit 23 is transmitted to the operation terminal 40 with which communication connection has been established.

The authority information request processing unit 46 executes authority information request processing. For example, the authority information request processing unit 46 executes processing, as the authority information request processing, in which the authority information request processing unit 46 requests the robot controller 20 with which communication connection has been established to transmit the current status of granting the operation authority of the robot 10 in the robot controller 20. Upon receiving the request for authority information from the operation terminal 40, the robot controller 20 transmits the authority information of the robot controller 20 indicating the current status of granting the operation authority to the operation terminal 40 that has made the request for the authority information.

Figure 7:
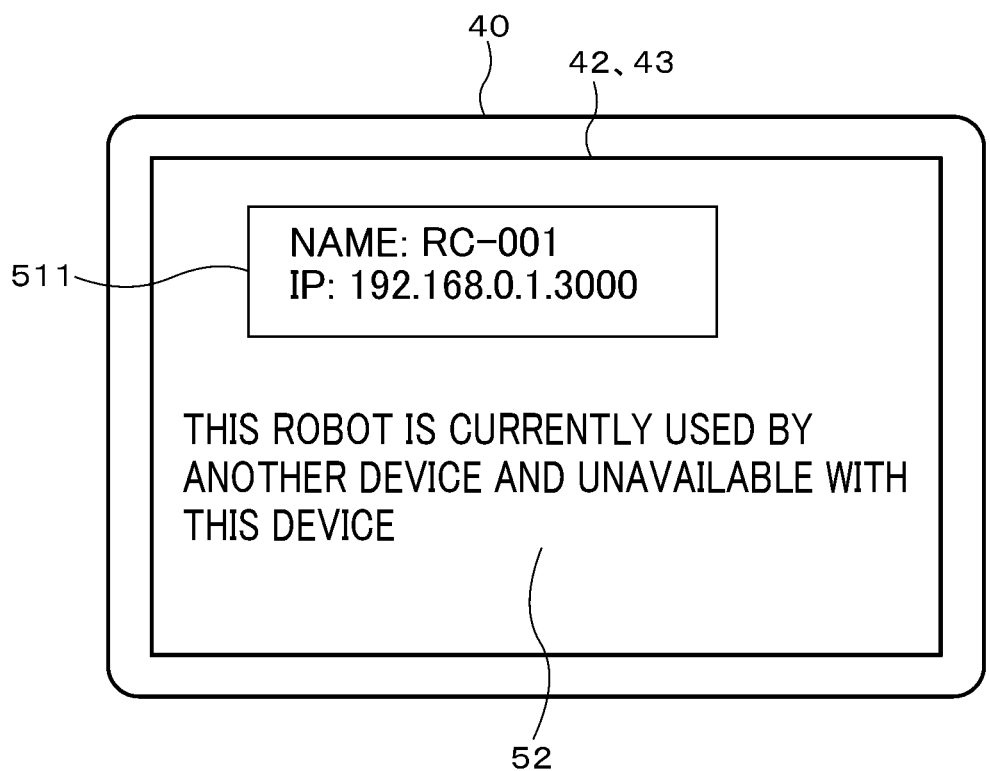
FIG. 7 is a diagram illustrating an example of contents displayed on a display unit of an operation terminal in a robot system according to the first embodiment.
Figure 8:
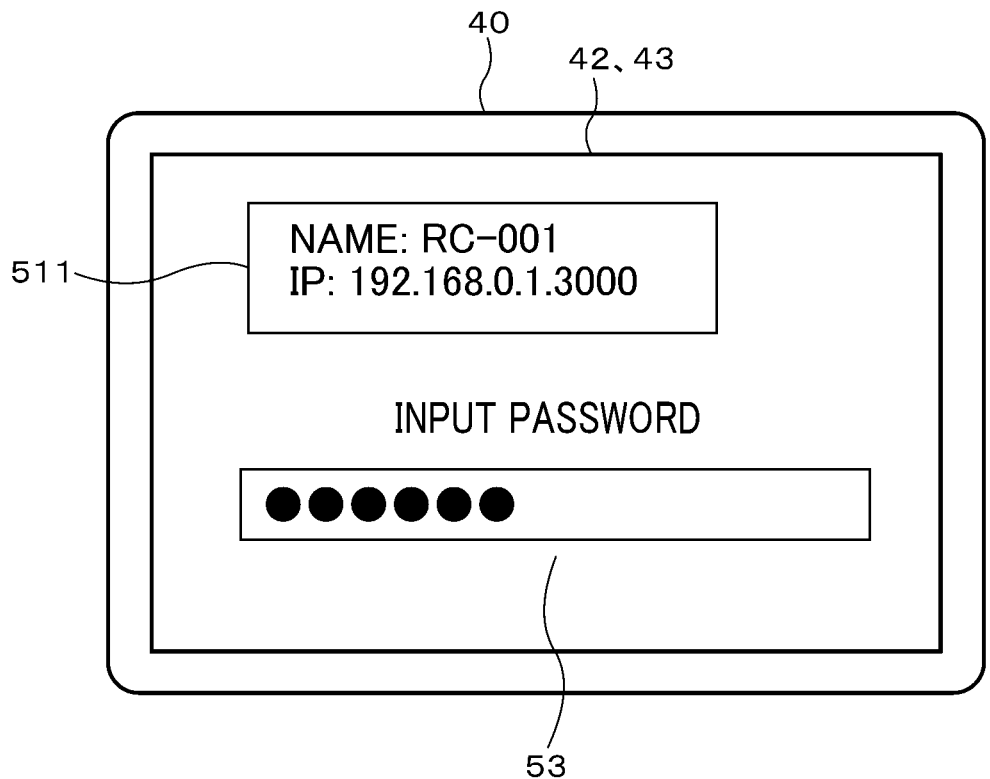
FIG. 8 is a diagram illustrating an example of contents displayed on a display unit of an operation terminal in a robot system according to the first embodiment.

The display processing unit 47 executes display processing by controlling the display unit 43 to display various information. For example, the display processing unit 47 executes processing, as the display processing, in which, when a plurality of operation terminals 40 are connected to the robot controller 20 and operation authority of the robot 10 is not yet granted to any operation terminal 40, a password input screen as shown in FIG. 8 is displayed on the display unit 43. Further, for example, the display processing unit 47 executes processing, as the display processing, in which, when a plurality of operation terminals 40 are connected to the robot controller 20 and operation authority has already been granted to another operation terminal 40, a message that the operation authority cannot be granted as shown in FIG. 7 is displayed on the display unit 43.

The password verification processing unit 48 executes password verification processing. For example, the password verification processing unit 48 executes processing, as the password verification processing, in which, when a password is input by the user after the password input screen shown in FIG. 8 is displayed on the display unit 43, the password transmitted from the robot controller 20 in the password request processing is collated with the password input by the user to the input unit 42 to thereby determine whether both passwords match.

The operation authority request processing unit 49 executes operation authority request processing. For example, the operation authority request processing unit 49 executes processing, as the operation authority request processing, in which, when the password verification processing unit 48 determines that passwords match, that is, when the password transmitted from the robot controller 20 in the password request processing matches the password input by the user to the input unit 42, the password verification processing unit 48 requests the robot controller 20 to grant the operation authority of the robot 10. Accordingly, when a request for granting operation authority is made by the operation authority request processing unit 49 of the operation terminal 40, the robot controller 20 grants the operation authority of the robot 10 to the operation terminal 40 that has made the request for granting operation authority by the function of the operation authority grant processing unit 26.

On the other hand, when the password verification processing unit 48 determines that the passwords do not match, that is, when the password transmitted from the robot controller 20 in the password request processing does not match the password input by the user to the input unit 42, the operation terminal 40 does not request the robot controller 20 to grant the operation authority of the robot 10. Accordingly, when the password transmitted from the robot controller 20 does not match the password input by the user to the input unit 42, the operation authority of the robot 10 is not granted to the operation terminal 40 to which the input operation has been performed by the user.

Next, with reference to FIGS. 2 to 12, control performed by the robot system 1 will be described including the operation performed by a user. In this case, it is assumed that the robot controller 20 and the operation terminal 40 have been powered on in advance. Further, it is assumed that an operation authority granting program has been activated in the robot controller 20.

Figure 2:
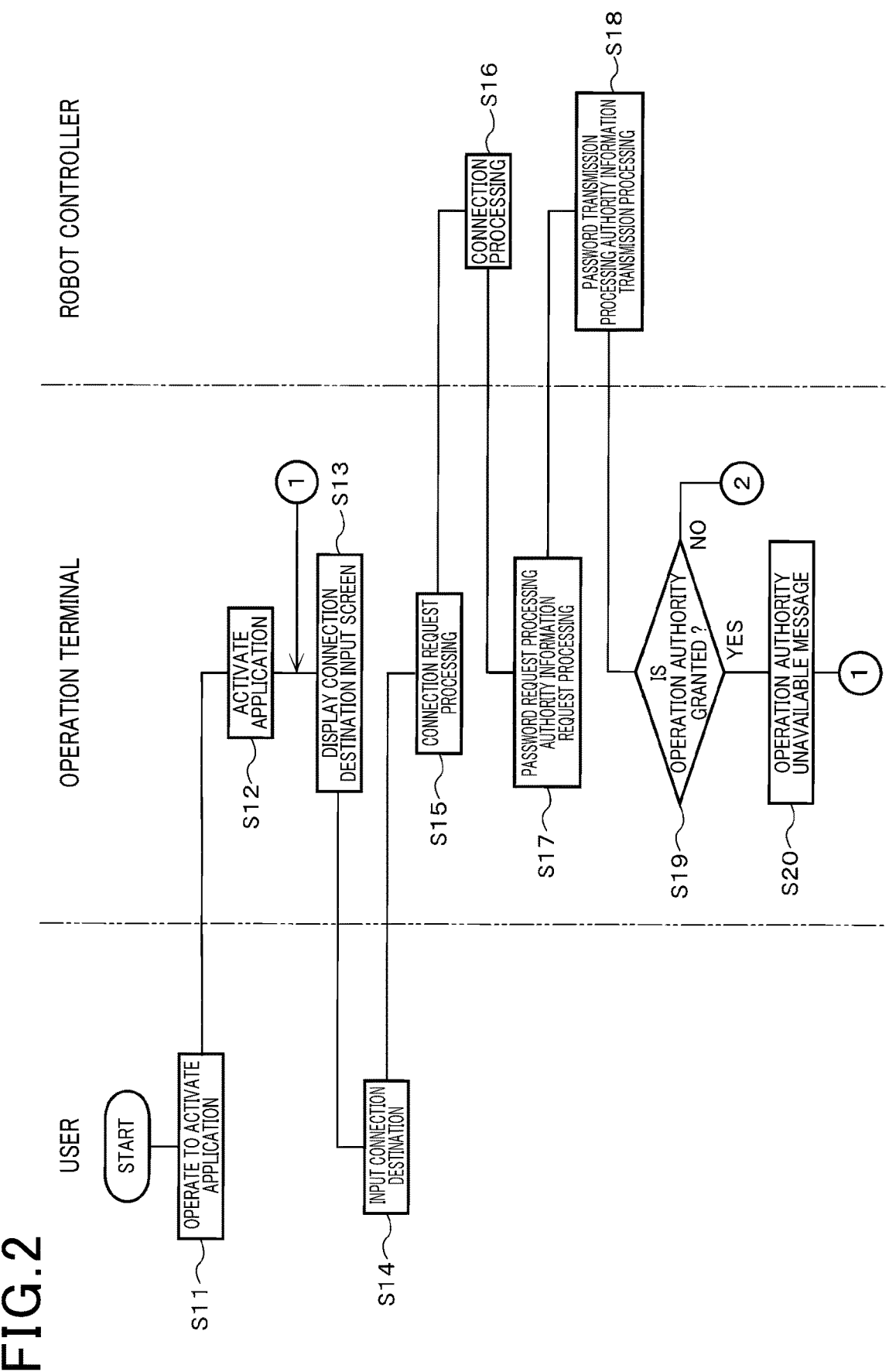
FIG. 2 is a flowchart illustrating an example of a control flow of a robot system according to the first embodiment.

First, in step S11 in FIG. 2, the user touches an icon of an application displayed on the display unit 43 as an operation to activate the application. Then, in step S12, the terminal control unit 41 of the operation terminal 40 causes an operation authority acquisition program stored in the storage area 412 to be executed in the CPU 411. Thus, the application for acquiring operation authority is activated.

Figure 6:
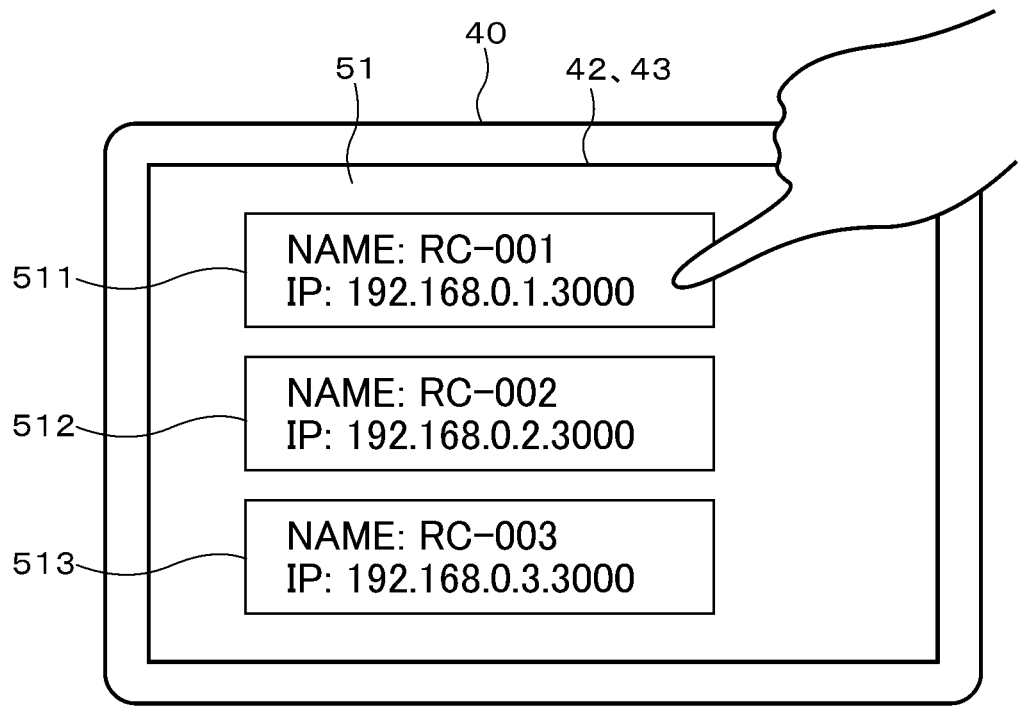
FIG. 6 is a diagram illustrating an example of contents displayed on a display unit of an operation terminal in a robot system according to the first embodiment.

When the terminal control unit 41 activates the application for acquiring operation authority, a connection destination input screen 51 is displayed on the display unit 43 by processing of the display processing unit 47 in step S13. FIG. 6 is an example of the connection destination input screen 51. The display unit 43 displays, for example, information 511 to 513 such as names of robots that can be communicably connected, that is, robots of connection destination candidates, and IP addresses of the robots of connection destination candidates.

When the connection destination input screen 51 is displayed on the display unit 43, the user operates the input unit 42 of the operation terminal 40 to input information of a connection destination in step S14 in FIG. 2. In this case, the display unit 43 displays a list of information 511 to 513 such as names and IP addresses of the robots 10 that can be communicably connected. The user selects a desired connection destination from the list by touching it to thereby input information of the desired connection destination. In this case, the robot 10 capable of communication connection with the operation terminal 40 may be, for example, all the robots 10 located within an area capable of wireless communication with the operation terminal 40, or may be a specific robot 10 registered in advance in the operation terminal 40. A desired connection destination may be selected, not only from a displayed list of information of the robots of connection destination candidates, but also by directly inputting the name and the IP address of the robot or by using a selection device, such as a mouse, connected to the operation terminal 40.

When information of the connection destination is input to the input unit 42 of the operation terminal 40, the operation terminal 40 executes connection request processing in step S15 in FIG. 2. In the connection request processing, the operation terminal 40 requests the robot controller 20 to establish communication connection. When receiving a request from the operation terminal 40 to establish communication connection, the robot controller 20 executes connection processing in step S16. Thus, communication connection between the robot 10 and the operation terminal 40 is established.

When communication connection between the operation terminal 40 and the robot controller 20 is established, the operation terminal 40 executes password request processing and authority information request processing in step S17 to request the robot controller 20 to transmit the password set to the robot controller 20 and the current status of granting the operation authority. When receiving a request from the operation terminal 40, the robot controller 20 executes password transmission processing and authority information transmission processing in step S18. Thus, the robot controller 20 transmits a proper predetermined password stored in the password storage unit 23 and authority information indicating the current status of granting the operation authority to the operation terminal 40.

Then, in step S19, the operation terminal 40 determines the granting status of the operation authority transmitted from the robot controller 20. When the operation terminal 40 determines that the robot controller 20 has already granted the operation authority to another operation terminal 40 (YES in step S19), it executes the processing of step S20. In step S20, the operation terminal 40 executes display processing and displays the operation authority unavailable message 52 on the display unit 43, for example, as shown in FIG. 7. Then, the operation terminal 40 again executes the processing of step S13, and again displays the connection destination input screen 51 on the display unit 43.

Figure 3:
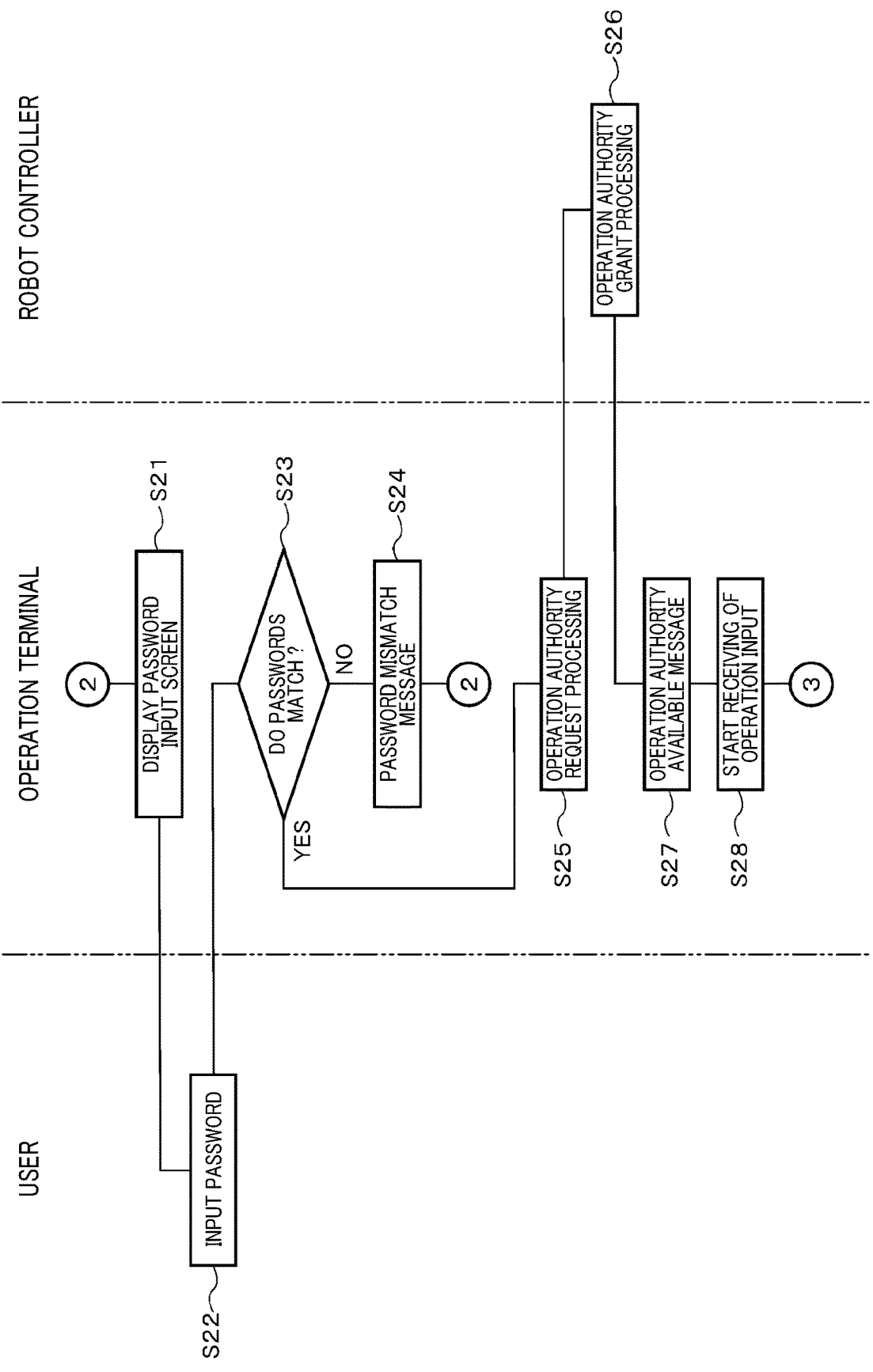
FIG. 3 is a flowchart illustrating an example of a control flow of a robot system according to the first embodiment.

On the other hand, when the operation terminal 40 determines that operation authority is not yet granted to any operation terminal 40 (NO in step S19), the operation terminal 40 executes the processing of step S21 shown in FIG. 3. In step S21, the operation terminal 40 displays the password input screen 53 on the display unit 43, for example, as shown in FIG. 8 by the display processing unit 47 executing the display processing.

Then, when the user operates the input unit 42 to input a password in step S22 in FIG. 3, the operation terminal 40 executes password verification processing by the function of the password verification processing unit 48 in step S23. When it is determined that the password input by the user does not match the proper predetermined password transmitted by the robot controller 20 in the password verification processing, that is, when the password input by the user is incorrect (NO in step S23), the operation terminal 40 executes the processing of step S24.

Figure 9:
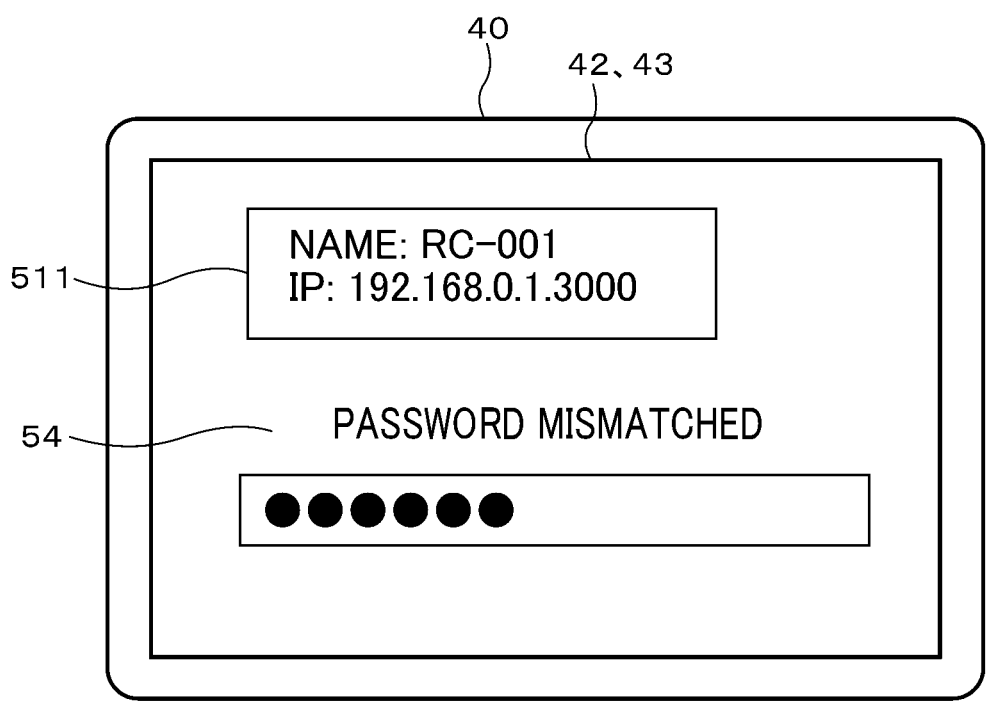
FIG. 9 is a diagram illustrating an example of contents displayed on a display unit of an operation terminal in a robot system according to the first embodiment.

In step S24, the operation terminal 40 executes display processing and displays the password mismatch message 54 on the display unit 43, for example, as shown in FIG. 9. Subsequently, the operation terminal 40 again executes the processing of step S21 shown in FIG. 3, and again displays the password input screen 53 on the display unit 43.

On the other hand, when it is determined that the password input by the user matches the proper predetermined password transmitted by the robot controller 20 in the password verification processing, that is, when the password input by the user is correct (YES in step S23 in FIG. 3), the operation terminal 40 executes the processing of step S25. In step S25, the operation terminal 40 executes operation authority request processing to request the robot controller 20 to grant operation authority of the robot 10.

When receiving a request from the operation terminal 40 to grant operation authority, the robot controller 20 executes operation authority grant processing in step S26. Thus, the robot controller 20 grants operation authority of the robot 10 to a single operation terminal 40 that has made the request for granting operation authority among a plurality of operation terminals 40 communicably connected to the robot controller 20.

Figure 10:
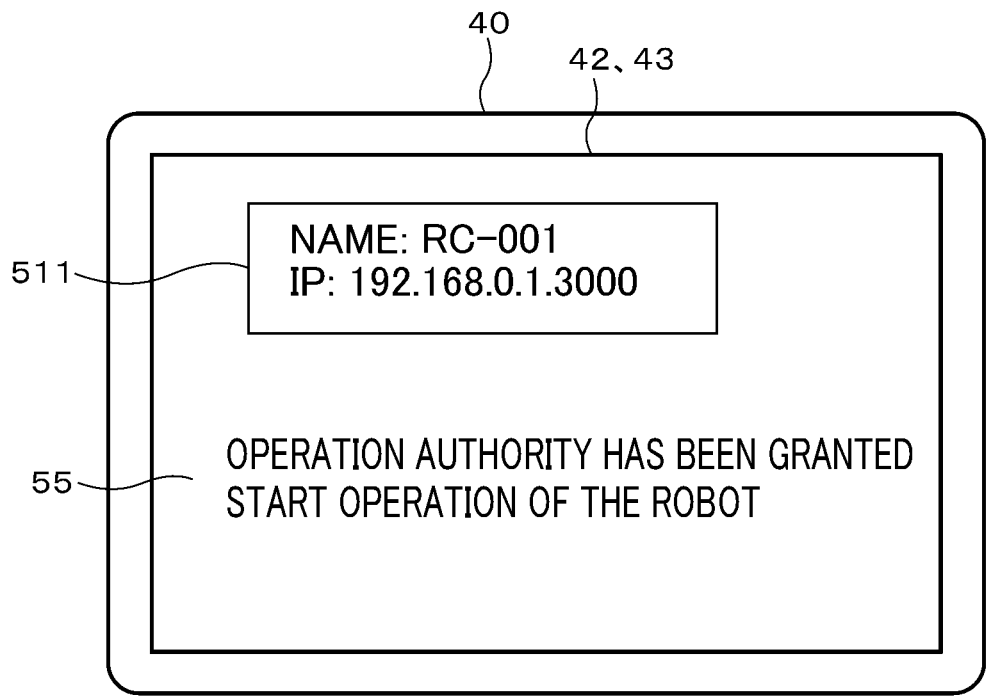
FIG. 10 is a diagram illustrating an example of contents displayed on a display unit of an operation terminal in a robot system according to the first embodiment.

When acquiring the operation authority of the robot 10 from the robot controller 20, the operation terminal 40 executes display processing of step S27. In step S27, the operation terminal 40 displays the operation authority available message 55 on the display unit 43, for example, as shown in FIG. 10 by the function of the display processing unit 47. After the operation terminal 40 completes execution of the processing of step S27, the operation terminal 40 executes the processing of step S28 to display the operation screen 56 on the display unit 43, for example, as shown in FIG. 11 and start receiving of an operation input from the user of the robot 10.

Figure 11:
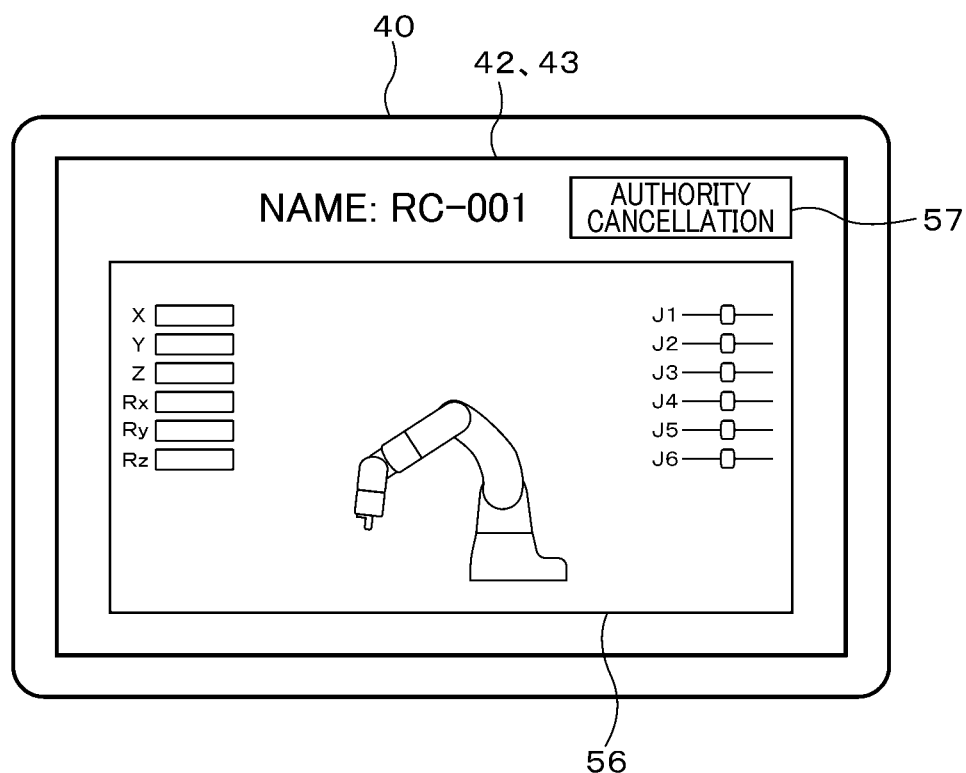
FIG. 11 is a diagram illustrating an example of contents displayed on a display unit of an operation terminal in a robot system according to the first embodiment.

In step S27, the operation terminal 40 displays an operation authority cancellation button 57 for cancelling the authority of the robot 10 together with the operation screen 56 for operating the robot 10 in the same screen as shown in FIG. 11. The user can cancel the operation authority of the robot 10 granted to the operation terminal 40 by performing a touch operation to the operation authority cancellation button 57, specifically, by touching the operation authority cancellation button 57. When the operation authority is cancelled, the robot controller 20 can again grant operation authority of the robot 10 to the operation terminal 40 according to the control content shown in FIGS. 2 and 3.

Figure 4:
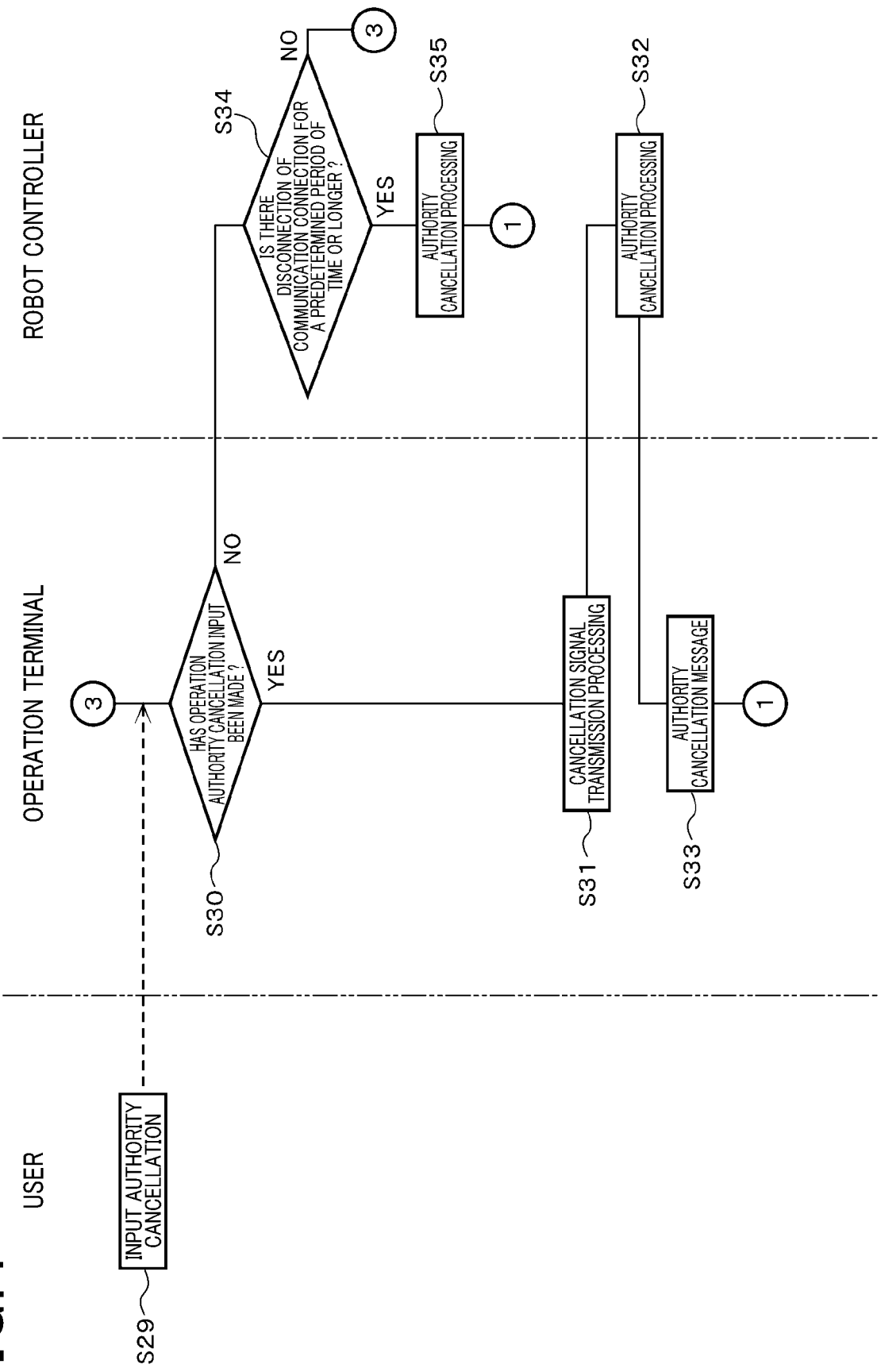
FIG. 4 is a flowchart illustrating an example of a control flow of a robot system according to the first embodiment.

Accordingly, the user performs a cancellation operation to the operation terminal 40 to cancel the operation authority of the robot 10 (step S29 in FIG. 4). When the operation terminal 40 acquires the operation authority of the robot 10 and becomes capable of operating the robot 10, it determines whether the user has performed an operation for cancelling the operation authority, that is, the user has touched the operation authority cancellation button 57 shown in FIG. 11 (step S30). When the user has made an operation authority cancellation input, that is, when it is determined that the operation authority cancellation button 57 has been touched (YES in step S30), the operation terminal 40 executes the processing of step S31.

In step S31, the operation terminal 40 executes cancellation signal transmission processing. For example, as the cancellation signal transmission processing, the operation terminal 40 transmits a signal to the robot controller 20 for requiring cancellation of the operation authority currently held by the operation terminal 40. Upon receiving the operation authority cancellation signal from the operation terminal 40, the robot controller 20 executes operation authority cancellation processing in step S32 to cancel the operation authority of the robot 10 that has been granted to the operation terminal 40. Accordingly, the robot controller 20 becomes capable of granting operation authority to other operation terminals 40.

Figure 12:
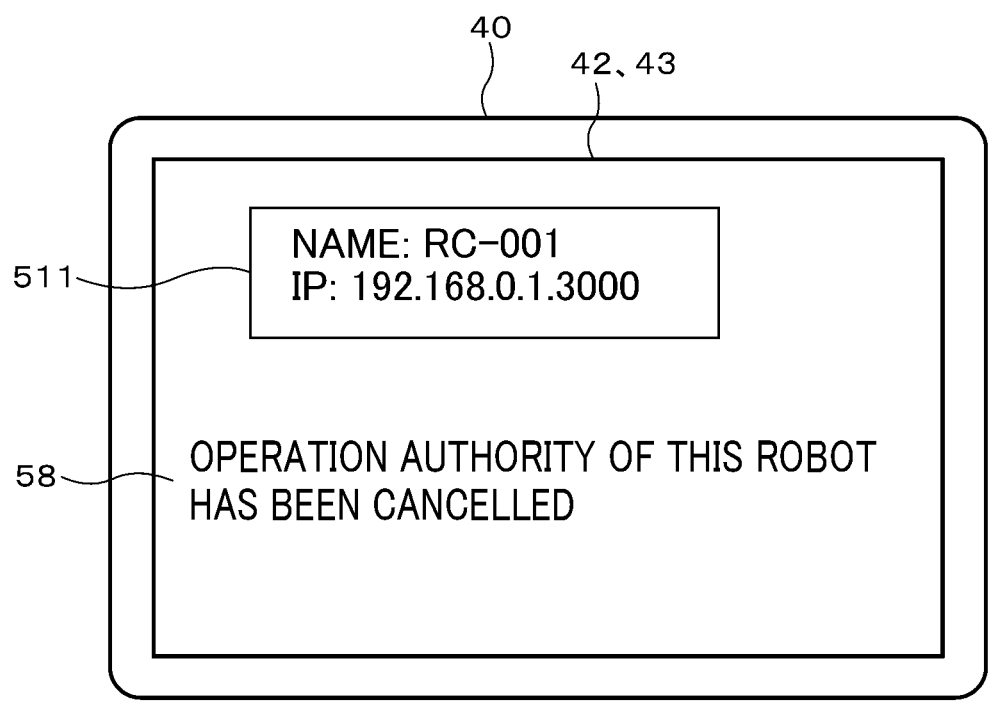
FIG. 12 is a diagram illustrating an example of contents displayed on a display unit of an operation terminal in a robot system according to the first embodiment.

Then, in step S33, the operation terminal 40 executes display processing to display a message that the operation authority has been cancelled (hereinafter, referred to as an operation authority cancellation message 58) on the display unit 43 as shown in FIG. 12. Then, the operation terminal 40 again becomes capable of executing the processing of step S13 in FIG. 2.

On the other hand, when the operation terminal 40 holds the operation authority and the user has not made an operation authority cancellation input, that is, the operation authority cancellation button 57 has not been touched after the operation screen 56 shown in FIG. 11 is displayed on the display unit 43 (No in step S30), the robot controller 20 executes the processing of step S34 shown in FIG. 4.

In step S34, the robot controller 20 determines whether the communication connection with the operation terminal 40 to which the operation authority has been granted is maintained. When it is determined that the communication connection with the operation terminal 40 is maintained, that is, when there is no disconnection of the communication connection for a predetermined period of time or longer (No in step S34), the robot controller 20 maintains the state in which the operation authority is granted to the operation terminal 40.

On the other hand, when it is determined that the communication connection with the operation terminal 40 is not maintained, that is, when there is disconnection of the communication connection for a predetermined period of time or longer (YES in step S34), the robot controller 20 executes operation authority cancellation processing in step S35 to cancel the operation authority of the robot 10 that has been granted to the operation terminal 40. This enables execution of processing from step S13 onward in FIG. 2 to other operation terminals 40 so that the operation authority can be granted to other operation terminals 40.

Figure 5:
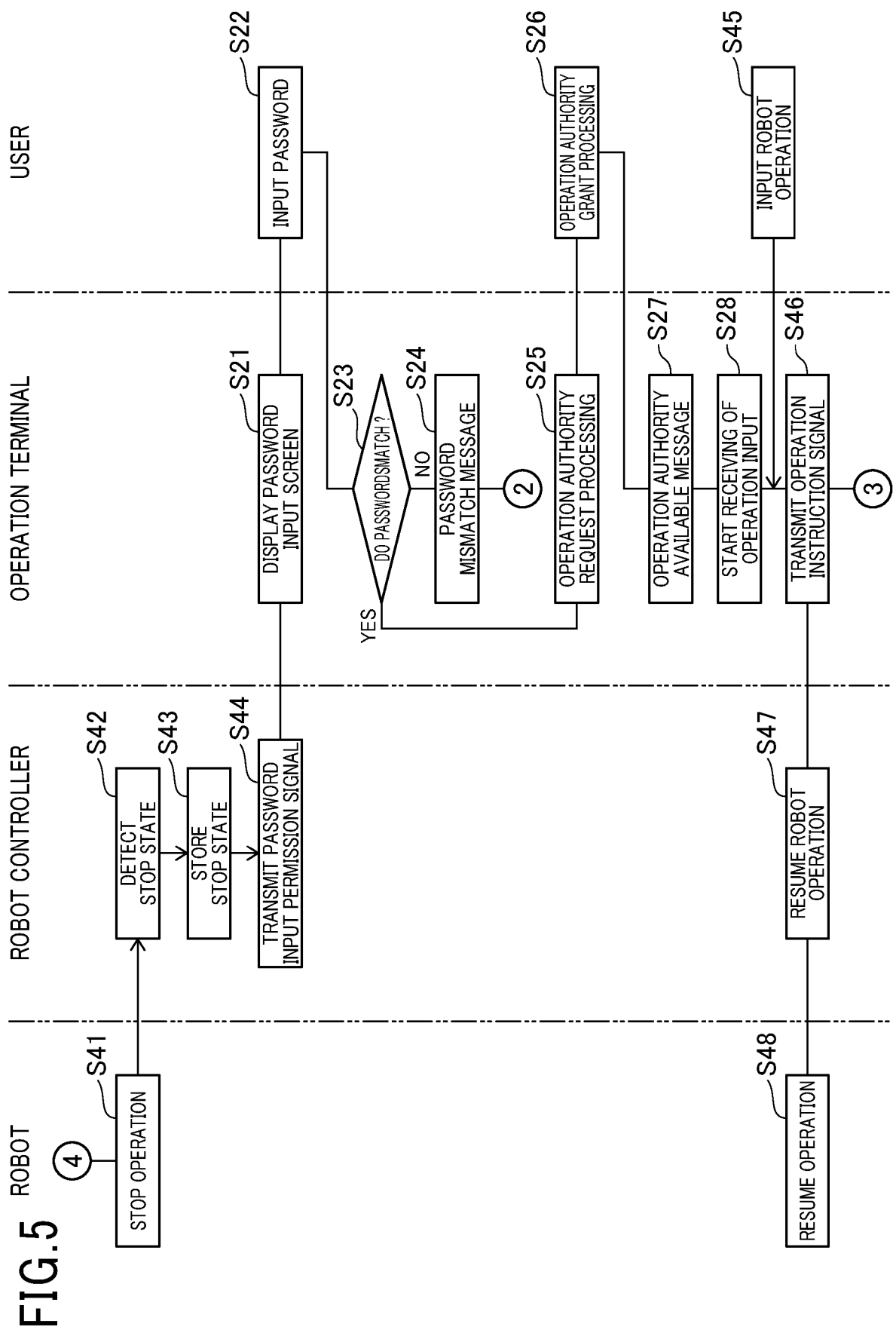
FIG. 5 is a flowchart illustrating an example of a control flow of a robot system according to the first embodiment.

Referring now to FIG. 5, the description will be given of the details of the processing performed by the robot controller 20 when the authority cancellation processing of step S35 is executed, that is, when it is determined there is no operation authority cancellation input by the user in step S30 and it is further determined that there is disconnection of the communication connection between the operation terminal 40 to which the operation authority of the robot 10 has been granted and the robot controller 20 for a predetermined period of time or longer in step S34, followed by cancellation of the operation authority that has been granted to the operation terminal 40.

In the present disclosure, for example, when the robot 10 cannot acquire control instruction from the operation terminal 40 to which the operation authority is granted, the robot controller 20 stops the operation of the robot 10 (step S41). The operation stop of the robot 10 may be automatically performed, or, for example, may be performed by the user's operation such as touching the button or the like provided on the robot 10.

In step S42, the robot controller 20 detects, for example, the position, posture, or the like of the robot 10 as a stop state of the robot 10 when the operation of the robot 10 stops. For example, when the robot 10 is an arm-type robot that transfers a predetermined number of items from a predetermined position to another position, the robot controller 20 detects the number of items that have been transferred, the posture of the arm of the robot 10, the open/closed position of the arm, and the open/closed degree of the arm. Further, for example, when the robot 10 is a cleaning robot, the position of the cleaning robot when it stops moving is detected. In step S42, the robot controller 20 stores the stop state of the robot 10 detected in step S41 in the storage unit 213, for example. The stop state of the robot 10 stored in the storage unit 213 is updatable. In step S44, the robot controller 20 transmits a password input permission signal to the communicable operation terminal 40. Then, the processing of steps S21 to S28 in FIG. 3 is executed.

The input permission signal transmitted from the operation terminal 40 to the robot controller in step S44 may include information indicating the stop state of the robot 10 stored in the storage unit 213. In this case, the operation terminal 40 that has received the input permission signal displays the received stop state on the display unit 43. Since the user can recognize the stop state of the robot 10 via the display unit 43 of the operation terminal 40, a burden of obtaining information required to recognize for restarting the robot 10 is reduced. After completion of the processing in step S28 in FIG. 3, the user inputs a robot operation to the operation terminal 40 in step S45 in FIG. 5. In step S46, the operation terminal 40 transmits an operation instruction signal corresponding to the robot operation that has input by the user to the robot controller 20. In step S47, the robot controller 20 resumes the operation of the robot 10 from the latest robot stop state. In step S47, for example, the robot controller 20 drives an actuator of the robot 10. Accordingly, in step S48, the operation of the robot 10 is started from the latest stop state of the robot 10.

According to the embodiment described above, the robot system 1 includes the robot 10, the operation terminal 40, and the robot controller 20. The operation terminal 40 can receive an input of password for acquiring operation authority of the robot 10 and an operation input for operating the robot 10 from the user. The robot controller 20 is configured to be communicable with a plurality of operation terminals 40, and can drive and control the robot 10 according to operation from a single operation terminal 40 among the plurality of operation terminals 40.

The robot controller 20 includes the password storage unit 23 and the operation authority grant processing unit 26. The password storage unit 23 stores a password for granting operation authority of the robot 10 to the operation terminal 40. The operation authority grant processing unit 26 grants operation authority of the robot 10 to a single operation terminal 40 to which a proper predetermined password stored in the password storage unit 23 is input among one or more operation terminals 40 that has established communication connection with the robot controller 20.

With this configuration, the robot controller 20 grants operation authority of the robot 10 to a single operation terminal 40 to which a proper predetermined password is input. That is, since the robot controller 20 grants operation authority to a single operation terminal 40 to which a proper predetermined password is input, the robot controller 20 does not simultaneously grant operation authority to a plurality of operation terminals 40. Accordingly, since one-to-one relationship can be established between the operation terminal 40 that receives operation from the user and the robot 10 to be operated, it is possible to prevent operation inputs from the plurality of operation terminals 40 from interfering with each other, and thus prevent an operation different from the intention of the user and ensure safety.

Further, according to the present embodiment, the robot controller 20 grants operation authority of the robot 10 to a single operation terminal 40 to which a proper predetermined password is input. That is, when the user inputs a password to the operation terminal 40, the operation terminal 40 to which the password is input can acquire the operation authority of the robot 10. With this configuration, the user can switch the operation terminal 40 that acquires operation authority by taking over the password without registering the ID information or the like of the operation terminal 40 to the robot controller 20.

As described above, according to the present embodiment, when the operation terminal 40 currently having the operation authority cannot be continuously used due to, for example, failure, loss, or battery exhaustion of the operation terminal 40 and needs to be switched to an alternative operation terminal 40 to operate the robot 10, the operation terminal 40 having the operation authority can be quickly and easily switched without requiring operation such as re-registration of the ID information of the alternative operation terminal 40 to the robot controller 20.

The operation terminal 40 includes the input unit 42, the password request processing unit 45, the password verification processing unit 48, and the operation authority request processing unit 49. The input unit 42 receives an input from the user. The password request processing unit 45 executes processing of requesting the robot controller 20 to transmit a proper predetermined password stored in the password storage unit 23 when communication connection with the robot controller 20 is established. The password verification processing unit 48 executes processing of collating the password received from the robot controller 20 and the password input to the input unit 42 when a password is input to the input unit 42 by the user. The operation authority request processing unit 49 executes processing of requesting the robot controller 20 to grant operation authority of the robot 10 when the result of verification performed by the password verification processing unit 48 indicates that the passwords match.

The robot controller 20 further includes the password transmission processing unit 24. The password transmission processing unit 24 executes processing of transmitting a password recorded in the password storage unit 23 to the operation terminal 40 with which communication connection has been established. When a request for granting the operation authority has been made by the operation authority request processing unit 49, the operation authority grant processing unit 26 grants the operation authority to the operation terminal 40 that has made the request for granting the operation authority.

With this configuration, password verification is performed by the operation terminal 40, not by the robot controller 20. Accordingly, even when the robot controller 20 is simultaneously accessed from a plurality of operation terminals 40, the robot controller 20 does not need to verify the password input to the respective operation terminals 40, which reduces the processing load of the robot controller 20.

There may be a case, for example, where the communication between the operation terminal 40 having the operation authority and the robot controller 20 is disconnected due to failure, battery exhaustion, or the like. In this case, if the operation authority of the operation terminal 40 whose communication is disconnected remains uncancelled, operation authority cannot be granted to an alternative operation terminal 40, and thus the operation terminal 40 cannot be switched to an alternative operation terminal 40. Further, when the user terminates the operation of the robot 10, the operation authority granted to the operation terminal 40 needs to be cancelled and quickly granted to another operation terminal 40 so that the robot 10 can be operated by the operation terminal 40 to which the operation authority is granted.

The robot controller 20 of the present embodiment further includes the operation authority cancellation processing unit 27. The operation authority cancellation processing unit 27 executes processing of cancelling the operation authority of the operation terminal 40 when the connection between the robot controller 20 and the operation terminal 40 to which the operation authority has been granted is disconnected and the connection with the operation terminal 40 to which the operation authority has been granted is not restored before a predetermined period of time elapses after the disconnection, or when an operation for cancelling the operation authority is input from the operation terminal 40 to which the operation authority has been granted.

With this configuration, the operation authority can be cancelled when the communication between the operation terminal 40 having the operation authority and the robot controller 20 is disconnected due to failure, battery exhaustion, or the like and the communication with the robot controller 20 is not restored before a predetermined period of time elapses, or at the user's discretion. Thus, the robot controller 20 can quickly grant operation authority to another operation terminal 40 to which operation authority is not granted.

The robot controller 20 further includes the authority information transmission processing unit 25. The authority information transmission processing unit 25 executes processing of transmitting authority information indicating the current status of granting the operation authority to the operation terminal 40 with which communication connection is established. Further, the operation terminal 40 includes the display unit 43 that displays information to the user, and the display processing unit 47. The display processing unit 47 displays the password input screen 53 on the display unit 43 when a granting status of the operation authority based on the authority information indicates that the operation authority is not yet granted to any operation terminal 40, and displays the operation authority unavailable message 52 on the display unit 43 when the operation authority has already been granted to another operation terminal 40.

Accordingly, the robot controller 20 is configured to prevent duplicate grant of operation authority to another operation terminal 40 when the operation authority has already been granted to a single operation terminal 40. The user can recognize the current status of the operation authority of the robot 10 from the content displayed on the display unit 43. This results in the improvement in user convenience.

The robot 10 may be assumed to collaborate with a human and designed to require no safety fence in the operation environment. Such a robot 10 is assumed to be used not only at a conventional manufacturing site or the like, which is familiar with the use of robots, but also in a non-manufacturing company or a general household, which is unfamiliar with the use of robots. According to the robot system 1 of the present embodiment, as described above, the operation terminal 40 having the operation authority can be easily switched without registering the ID information or the like of the operation terminal 40 to the robot controller 20. Therefore, the robot can be easily used in a non-manufacturing company or a general household, which is unfamiliar with the use of robots.

The robot controller 20 is configured to store a stop state of the operation of the robot 10, and resume the control of the robot 10 according to the latest stop state of the operation of the robot 10. With this configuration, even when the operation of the robot 10 stops due to disconnection of communication between the operation terminal 40 to which the operation authority is granted and the robot controller 20, the control of the robot 10 can be resumed without setting the position, posture, remaining execution operation, and the like of the robot 10 when the robot 10 resumes the control being set to the robot controller 20 by the user.

Second Embodiment

Next, with reference to FIGS. 13 to 15, a second embodiment of the present disclosure will be described. The components and processing which are substantially the same as those of the first embodiment are denoted by the same reference signs, and the description thereof will be omitted. In the first embodiment, the password verification processing unit 48 of the operation terminal 40 determines whether the password input to the operation terminal 40 is a proper predetermined password. On the other hand, in the present embodiment, the password input to the operation terminal 40 is transmitted from the operation terminal 40 to the robot controller 20, and the robot controller 20 executes processing of verifying the password whether it is a proper predetermined password. In this case, the operation authority grant processing unit 26 of the robot controller 20 grants operation authority to the operation terminal 40 according to the results of password verification performed by the robot controller 20.

Specifically, the robot controller 20 of the second embodiment includes the password verification processing unit 48 instead of the password transmission processing unit 24 of the first embodiment. The password verification processing unit 48 executes password verification processing in the same manner as the password verification processing unit 48 of the operation terminal 40 does in the first embodiment. That is, the password verification processing unit 48 collates the password input to the input unit 42 of the operation terminal 40, that is, input information and a proper predetermined password stored in the password storage unit 23 of the robot controller 20, and determines whether both passwords match.

Figure 13:
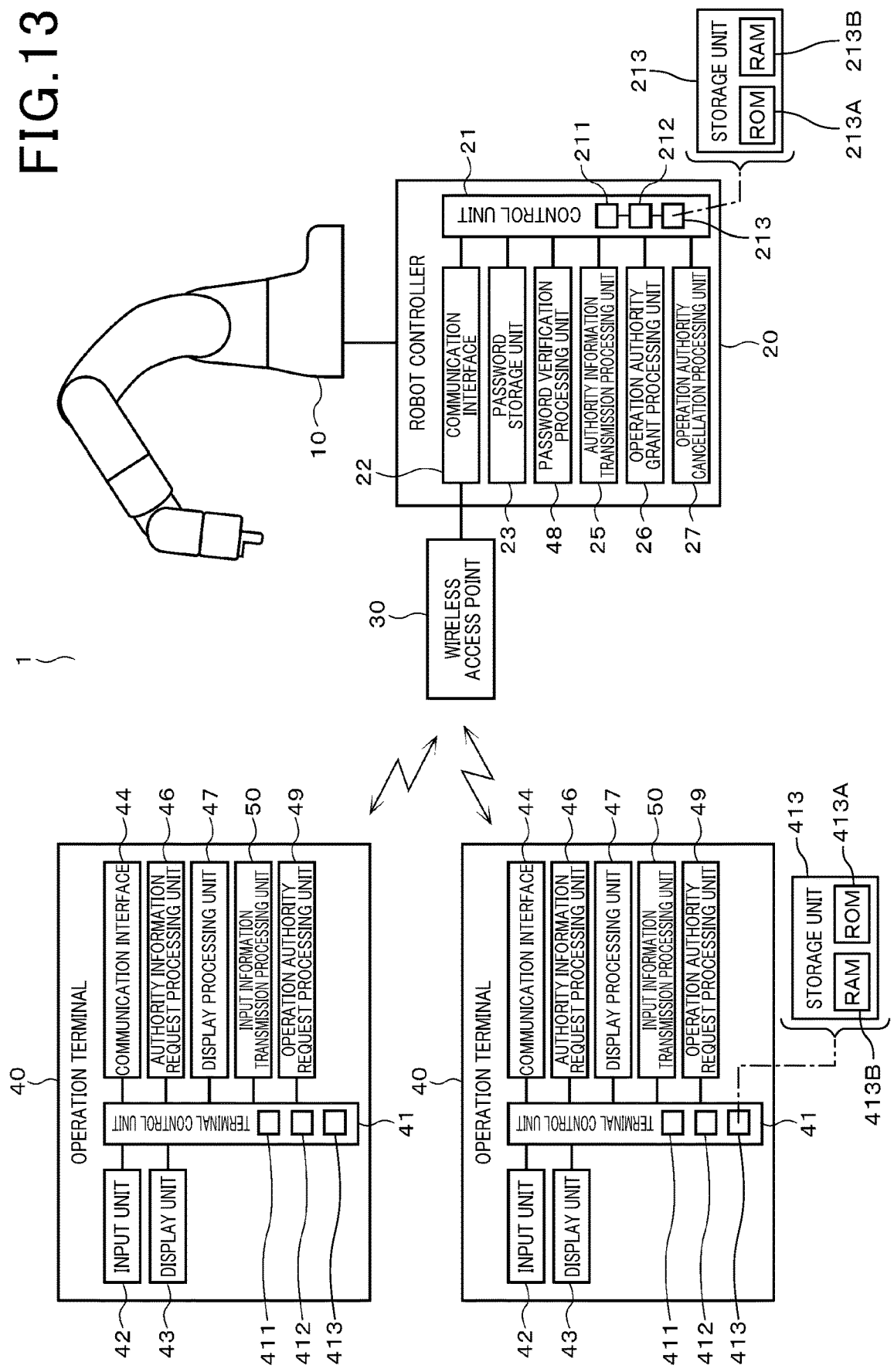
FIG. 13 is a block diagram schematically illustrating an example of a configuration of a robot system according to a second embodiment.

Further, the operation terminal 40 of the second embodiment does not include the password request processing unit 45 and the password verification processing unit 48 of the first embodiment, and instead includes an input information transmission processing unit 50 shown in FIG. 13. The input information transmission processing unit 50 executes input information transmission processing. The input information transmission processing is processing of transmitting a password input to the input unit 42 by the user, that is, input information to the robot controller 20, for example, when the password input screen 53 shown in FIG. 8 is displayed on the display unit 43.

Figure 14:
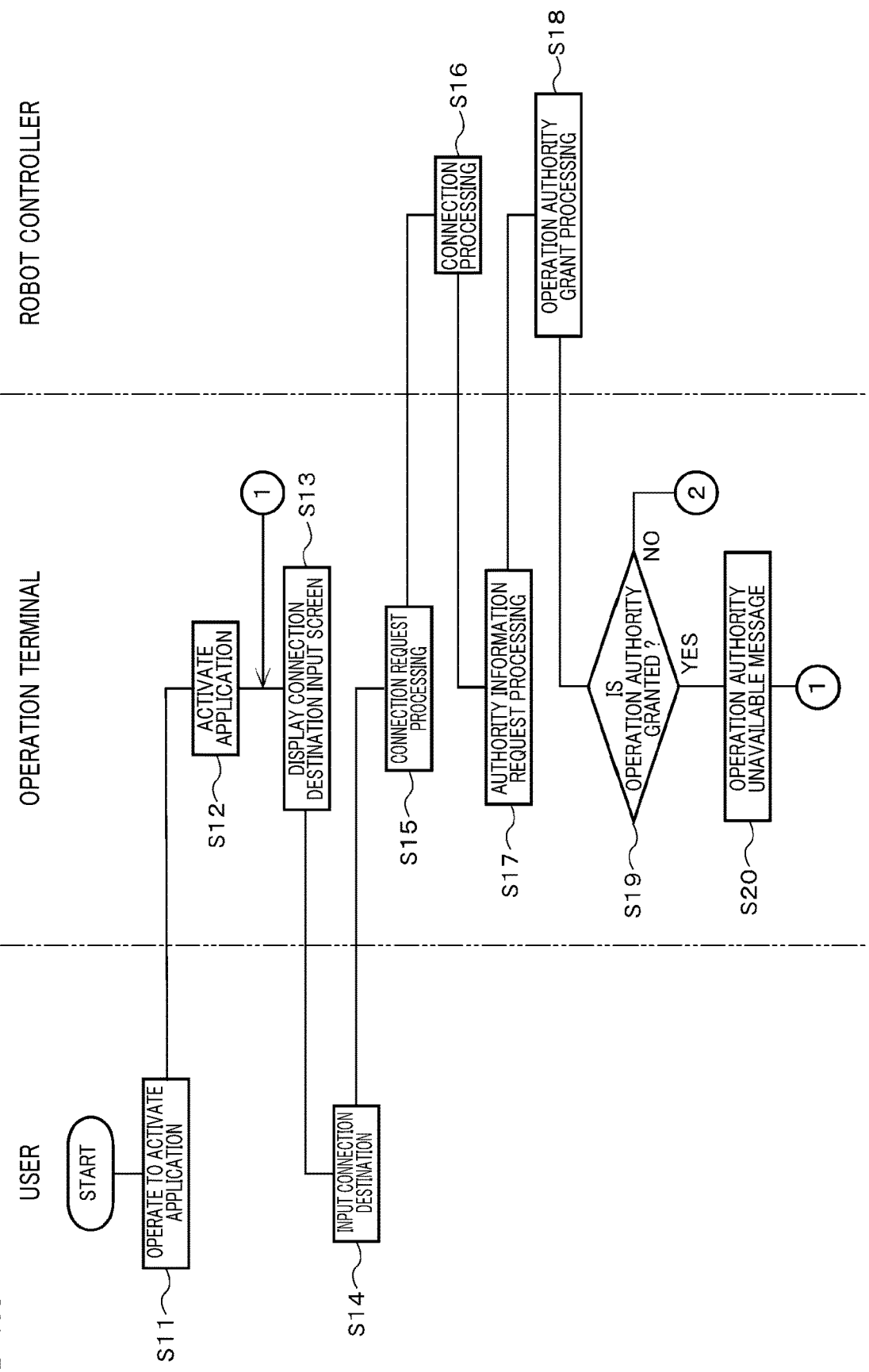
FIG. 14 is a flowchart illustrating an example of a control flow of a robot system according to a second embodiment.
Figure 15:
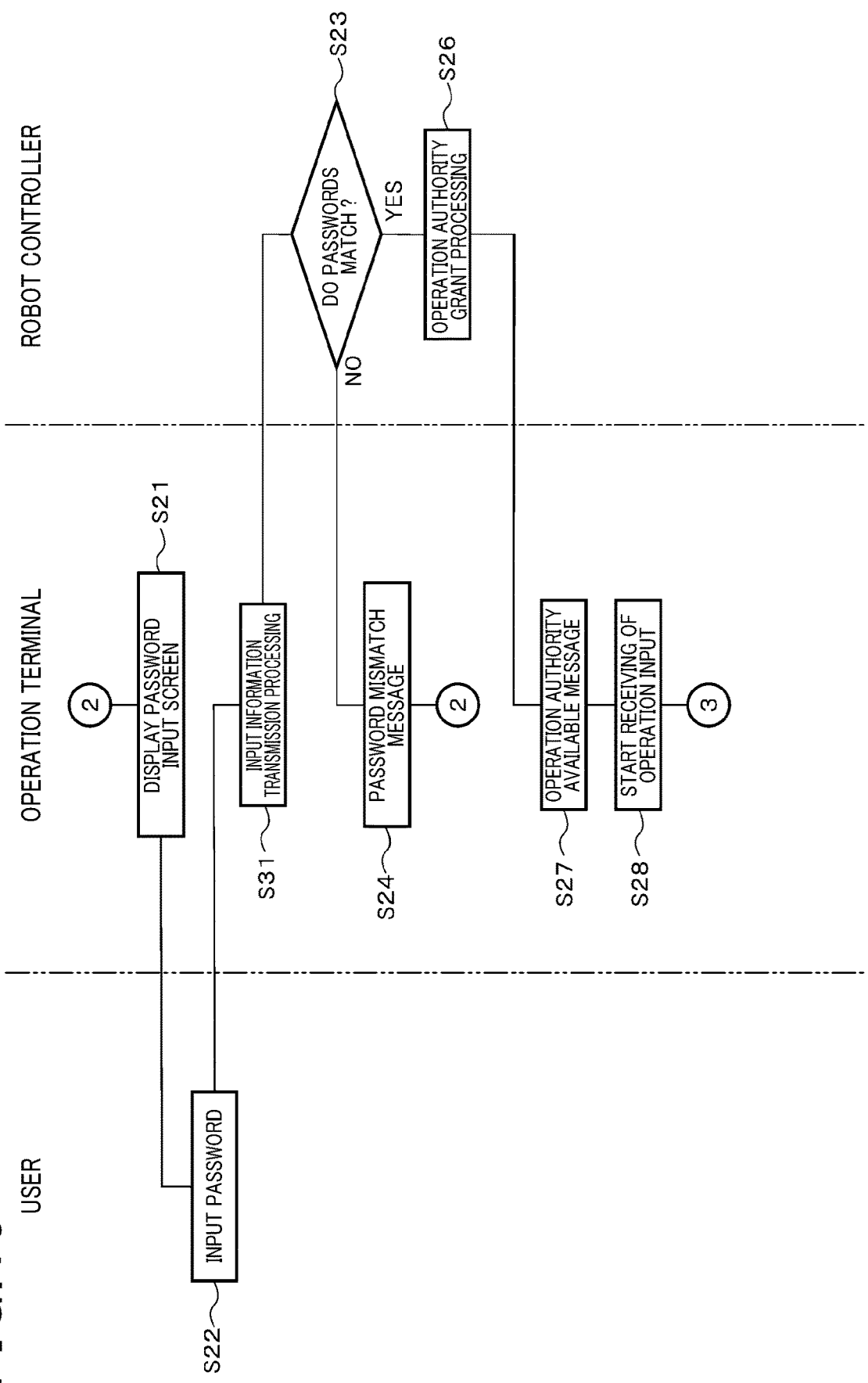
FIG. 15 is a flowchart illustrating an example of a control flow of a robot system according to a second embodiment.

The configuration of the second embodiment differs from the first embodiment in the control content in that the operation terminal 40 is not required to execute password request processing in step S17 as shown in FIG. 14. Further, when a password is input to the input unit 42 by the user, the operation terminal 40 executes input information transmission processing in step S31 in FIG. 15, to thereby transmit the input information input by the user to the robot controller 20.

Then, in step S23, the robot controller 20 verifies the password input to the operation terminal 40. When it is determined that the passwords do not match (NO in step S23), the robot controller 20 transmits a signal indicating that the passwords do not match to the operation terminal 40. When it is determined that the passwords match (YES in step S23), in step S26, it grants operation authority of the robot 10 to the operation terminal 40 to which the identifiable code used for the verification has been input.

According to the configuration of the second embodiment described above, the same effects as those in the first embodiment can be obtained.

Furthermore, according to the present embodiment, password verification is performed by the robot controller 20 itself, not by the operation terminal 40. Accordingly, the robot controller 20 does not need to transmit a password to each operation terminal 40. Therefore, a risk that the password may leak from the robot controller 20 can be reduced, and as a result, for example, high security against malicious control of the robot 10 using a password can be ensured.

(Modifications)

In the above first and second embodiments, for example, the robot controller 20 and the operation terminal 40 may perform the following functions. The display unit 43 is provided in either the robot controller 20 or the operation terminal 40. The display unit 43 is configured to display a storage location of the operation terminal 40. The operation authority cancellation processing unit 27 transmits a cancellation signal to the display unit 43, as the operation authority cancellation processing, after it completes the processing of cancelling the operation authority from the operation terminal 40. Upon receiving the cancellation processing signal, the display unit 43 displays a location where the operation terminal 40 is stored.

According to the above configuration, the following effects are achieved in the modified example.

As described above, the first and second embodiments are characterized by maintaining a state in which a single robot 10 is controlled by a single operation terminal 40. Accordingly, the operation terminals 40 other than the operation terminal 40 controlling the robot 10 may be stored in a predetermined storage location to prevent loss or the like. In this situation, when it becomes necessary to switch the operation terminal 40 while the robot 10 is operated by a user who does not know the storage location of the operation terminal 40, preparation of an alternative operation terminal 40 may be delayed, leading to a failure in quick switching of the operation terminal 40. In the modified example, however, when the operation authority cancellation processing unit 27 completes processing of cancelling the operation authority from the operation terminal 40 as the operation authority cancellation processing, the display unit 43 displays the storage location of a candidate alternative operation terminal 40 when it becomes necessary to switch the operation terminal 40. Accordingly, even when it becomes necessary for a user of the robot 10 who does not know the storage location of the operation terminal 40 to switch the operation terminal 40, the operation terminal 40 can be quickly switched by recognizing the storage location of the operation terminal 40 displayed on the display unit 43.

In the present disclosure, the first and second embodiments and the modified example can be implemented as a method of controlling the robot 10. In this case, the method of controlling the robot 10 according to the modified example has the same effects as those of the first and second embodiments and the modified example.

Each embodiment described above is not limited to the embodiments described above and shown in the drawings, and can be modified as appropriate without departing from the scope of the invention.

REFERENCE SIGNS LIST

Throughout the drawings, 1 refers to a robot system, 10 refers to a robot, 20 refers to a robot controller, 23 refers to a password storage unit, 24 refers to a password transmission processing unit, 25 refers to an authority information transmission processing unit, 26 refers to an operation authority grant processing unit, 27 refers to an operation authority cancellation processing unit, 40 refers to an operation terminal, 42 refers to an input unit, 43 refers to a display unit, 45 refers to a password request processing unit, 46 refers to an authority information request processing unit, 47 refers to a display processing unit, 48 refers to a password verification processing unit, 49 refers to an operation authority request processing unit, and 50 refers to an input information transmission processing unit.

What is claimed is:

1. A robot system comprising:
   a robot;
   an operation terminal that receives an input of an authority code for acquiring operation authority of the robot and an operation input for operating the robot from a user of the robot; and
   a robot controller configured to be communicable with a plurality of the operation terminals and grant operation authority of the robot to the operation terminal, the robot controller being configured to drive and control the robot according to the operation input from a single operation terminal to which the operation authority has been granted among the plurality of the operation terminals, cancel the operation authority that has been granted to the operation terminal, and be capable of granting the operation authority to a single operation terminal to which the operation authority has not been granted, wherein
   the robot controller includes:
   an authority code storage unit that stores a proper predetermined authority code for granting operation authority of the robot to the operation terminal; and
   an operation authority grant processing unit that determines whether the operation authority of the robot has not been granted to any operation terminal, and, when it is determined that the operation authority of the robot has not been granted to any operation terminal, grants the operation authority of the robot to a single operation terminal to which the predetermined authority code stored in the authority code storage unit is first input.

2. The robot system according to claim 1, wherein the operation terminal includes:
   an input unit that receives the operation input from a user of the robot and detects the operation input;
   an authority code request processing unit that requests the robot controller with which communication connection is established, when the communication connection with the robot controller is established, to transmit the predetermined authority code stored in the authority code storage unit;
   an authority code verification processing unit that verifies and determines whether the predetermined authority code received from the robot controller matches the authority code input to the input unit when the authority code is input to the input unit by a user; and
   an operation authority request processing unit that requests the robot controller to grant the operation authority of the robot when the authority code verification processing unit determines that the authority codes match,
   the robot controller further includes
   an identification code transmission processing unit that transmits the predetermined authority code recorded in the authority code storage unit to the operation terminal with which communication connection is established, and,
   when a request for granting the operation authority is made by the operation authority request processing unit, the operation authority grant processing unit grants the operation authority to the operation terminal that has made the request for granting the operation authority.

3. The robot system according to claim 1, wherein the operation terminal includes:
   an input unit that receives the operation input from a user of the robot and detects the operation input; and
   an information transmission processing unit that transmits input information based on the operation input to the robot controller when the input unit detects the operation input from the user,
   the robot controller further includes
   an authority code verification processing unit that verifies and determines whether the input information received from the operation terminal matches the predetermined authority code stored in the authority code storage unit, and,
   when the authority code verification processing unit determines that the input information received from the operation terminal matches the predetermined authority code stored in the authority code storage unit, the operation authority grant processing unit grants the operation authority of the robot to the operation terminal that has transmitted the input information.

4. The robot system according to claim 1, wherein the robot controller further includes
   an operation authority cancellation processing unit that determines whether connection with the operation terminal to which the operation authority has been granted is disconnected and communication with the robot controller is restored before a predetermined period of time elapses after the disconnection, and, when it is determined that connection with the operation terminal to which the operation authority has been granted is disconnected and communication with the robot controller is not restored before a predetermined period of time elapses after the disconnection, or when an operation for cancelling the operation authority is input from the operation terminal to which the operation authority has been granted, cancels the operation authority to the operation terminal.

5. The robot system according to claim 4, wherein the robot controller further includes
   an authority information transmission processing unit that transmits authority information indicating a current status of granting the operation authority to the operation terminal with which communication connection is established, and
   the operation terminal further includes:
   a display unit that displays information to a user of the robot; and
   a display processing unit that displays an input screen of the authority code on the display unit when a granting status of the operation authority based on the authority information indicates that the operation authority is not granted to any operation terminal, and displays a message on the display unit that the operation authority cannot be granted when the operation authority has already been granted to another operation terminal.

6. The robot system according to claim 5, wherein the robot is assumed to collaborate with a human, and is designed to require no safety fence in an operation environment of the robot.

7. The robot system according to claim 4, wherein
   a display unit is provided in either the operation terminal or the robot controller, the display unit being configured to display a storage location of the operation terminal to a user of the robot,
   the operation authority cancellation processing unit, when cancelling the operation authority from the operation terminal, transmits a cancellation signal to the display unit, and
   the display unit, when receiving the cancellation signal from the operation authority cancellation processing unit, displays a storage location of the operation terminal.

8. The robot system according to claim 2, wherein the robot controller further includes
   an operation authority cancellation processing unit that determines whether connection with the operation terminal to which the operation authority has been granted is disconnected and communication with the robot controller is restored before a predetermined period of time elapses after the disconnection, and, when it is determined that connection with the operation terminal to which the operation authority has been granted is disconnected and communication with the robot controller is not restored before a predetermined period of time elapses after the disconnection, or when an operation for cancelling the operation authority is input from the operation terminal to which the operation authority has been granted, cancels the operation authority to the operation terminal.

9. The robot system according to claim 8, wherein the robot controller further includes
   an authority information transmission processing unit that transmits authority information indicating a current status of granting the operation authority to the operation terminal with which communication connection is established, and the operation terminal further includes:
- a display unit that displays information to a user of the robot; and
- a display processing unit that displays an input screen of the authority code on the display unit when a granting status of the operation authority based on the authority information indicates that the operation authority is not granted to any operation terminal, and displays a message on the display unit that the operation authority cannot be granted when the operation authority has already been granted to another operation terminal.

10. The robot system according to claim 9, wherein the robot is assumed to collaborate with a human, and is designed to require no safety fence in an operation environment of the robot.

11. The robot system according to claim 3, wherein the robot controller further includes
- an operation authority cancellation processing unit that determines whether connection with the operation terminal to which the operation authority has been granted is disconnected and communication with the robot controller is restored before a predetermined period of time elapses after the disconnection, and, when it is determined that connection with the operation terminal to which the operation authority has been granted is disconnected and communication with the robot controller is not restored before a predetermined period of time elapses after the disconnection, or when an operation for cancelling the operation authority is input from the operation terminal to which the operation authority has been granted, cancels the operation authority to the operation terminal.

12. The robot system according to claim 11, wherein the robot controller further includes
- an authority information transmission processing unit that transmits authority information indicating a current status of granting the operation authority to the operation terminal with which communication connection is established, and the operation terminal further includes:
- a display unit that displays information to a user of the robot; and
- a display processing unit that displays an input screen of the authority code on the display unit when a granting status of the operation authority based on the authority information indicates that the operation authority is not granted to any operation terminal, and displays a message on the display unit that the operation authority cannot be granted when the operation authority has already been granted to another operation terminal.

13. The robot system according to claim 12, wherein the robot is assumed to collaborate with a human, and is designed to require no safety fence in an operation environment of the robot.

14. A non-transitory computer-readable medium storing a program executable by a robot controller that includes an authority code storage unit that stores a proper predetermined authority code for granting operation authority of a robot to an operation terminal, the robot controller being configured to be communicable with a plurality of the operation terminals, and drive and control the robot according to operation from a single operation terminal among the plurality of the operation terminals, and
- causing the robot controller to execute operation authority grant processing that determines whether the operation authority of the robot has not been granted to any operation terminal, and, when it is determined that the operation authority of the robot has not been granted to any operation terminal, grants the operation authority of the robot to a single operation terminal to which the predetermined authority code stored in the authority code storage unit is first input.

15. A robot controller configured to control operation of a robot, the robot controller comprising:
- a communication interface communicating with an operation device, the communication interface receiving an operation input for operating the robot;
- an authority code storage unit that stores a proper predetermined authority code for granting operation authority of the robot to the operation device; and
- an operation authority grant processing unit that determines whether the operation authority of the robot has not been granted to any operation terminal, and, when it is determined that the operation authority of the robot has not been granted to any operation terminal, grants the operation authority of the robot to a single operation terminal to which the predetermined authority code stored in the authority code storage unit is first input.

16. An operation terminal configured to transmit an operation instruction signal for a robot, the operation terminal comprising:
- an input unit that detects an authority code;
- a communication interface that communicates with a robot controller that controls the robot; and
- an authority request processing unit that requests the robot to grant operation authority via the communication interface when the input unit detects the authority code, wherein,
- when the operation terminal acquires the operation authority after the authority request processing unit requests granting of the operation authority, the operation terminal transmits an operation instruction signal for the robot to the robot controller based on a predetermined operation detected by the input unit.

17. A method of controlling a robot, in which operation authority of a single robot is granted to a single operation terminal among a plurality of the operation terminals capable of being connected to the single robot via a robot controller to thereby enable the single operation terminal to which the operation authority is granted to operate the single robot, the method comprising the steps of:
- establishing connection between at least one of the plurality of the operation terminals and the robot controller;
- determining whether the operation authority is granted to the operation terminal connected to the robot controller;
- when it is determined that the operation authority has not been granted to the operation terminal, determining whether a proper predetermined authority code is input to the operation terminal to which the operation authority has been determined as not being granted; and,
- when it is determined that the authority code has been input, granting the operation authority to the operation terminal to which the operation authority has been determined as not being granted.

* * * * *